United States Patent
Becker et al.

(10) Patent No.: US 10,545,953 B2
(45) Date of Patent: Jan. 28, 2020

(54) MODERN SPREADSHEET ARRAYS

(71) Applicant: Microsoft Technology Licensing, LLC, Redmond, WA (US)

(72) Inventors: Andrew Becker, Duvall, WA (US); John Campbell, Woodinville, WA (US); Joseph McDaid, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 362 days.

(21) Appl. No.: 15/340,643

(22) Filed: Nov. 1, 2016

(65) Prior Publication Data

US 2017/0124142 A1 May 4, 2017

Related U.S. Application Data

(60) Provisional application No. 62/250,393, filed on Nov. 3, 2015.

(51) Int. Cl.
*G06F 17/00* (2019.01)
*G06F 16/23* (2019.01)
*G06F 17/24* (2006.01)
*G06F 3/0484* (2013.01)

(52) U.S. Cl.
CPC ...... *G06F 16/2379* (2019.01); *G06F 16/2365* (2019.01); *G06F 17/246* (2013.01); *G06F 3/04842* (2013.01)

(58) Field of Classification Search
CPC .................................................. G06F 17/246
See application file for complete search history.

(56) References Cited

U.S. PATENT DOCUMENTS

| | | | |
|---|---|---|---|
| 6,549,878 B1 | 4/2003 | Lowry et al. | |
| 7,237,186 B2 | 6/2007 | Androski et al. | |
| 8,689,095 B2 | 4/2014 | Parish et al. | |
| 2002/0004801 A1 | 1/2002 | Todd | |
| 2006/0107196 A1 | 5/2006 | Thanu et al. | |
| 2006/0174189 A1 | 8/2006 | Weitzman et al. | |
| 2007/0050697 A1 | 3/2007 | Lewis-Bowen et al. | |
| 2009/0138428 A1* | 5/2009 | Thomsen | .......... G06F 17/30536 |
| 2013/0290823 A1 | 10/2013 | Thanu et al. | |

(Continued)

FOREIGN PATENT DOCUMENTS

| | | |
|---|---|---|
| EP | 1256890 A2 | 11/2002 |
| GB | 2358936 A | 8/2001 |

OTHER PUBLICATIONS

"Using arrays in Google Sheets", Published on: Sep. 21, 2015 Available at: https://support.google.com/docs/answer/6208276?hl=en, 2 pgs.

(Continued)

*Primary Examiner* — Grace Park

(57) ABSTRACT

The present disclosure provides a novel approach for creating and referencing arrays as implemented in a spreadsheet application. Aspects of the present disclosure include, but are not limited to: referencing arrays, creating dynamic arrays, collapsing values of an array into a single cell, spilling values of an array to a table, referencing one or more values in collapsed arrays, visually indicating no spill errors while maintaining calculation capabilities thereon, and implicit intersection of data.

20 Claims, 28 Drawing Sheets

(56) References Cited

U.S. PATENT DOCUMENTS

2014/0181628 A1    6/2014  Hogan et al.
2014/0372851 A1   12/2014  Rutherford et al.

OTHER PUBLICATIONS

"How to Prevent Text from Spilling over to Next Cell in Excel?", Published on: Jun. 8, 2015 Available at: http://www.extendoffice.com/documents/excel/2508-excel-prevent-text-spilling-over-or-overlapping.html, 3 pgs.

Wyatt, Allen, "Merging Cells to a Single Sum", Published on: Oct. 28, 2011 Available at: http://excel.tips.net/T003026_Merging_Cells_to_a_Single_Sum.html, 2 pgs.

James, "Excel Intersection 101: Implicit Intersection", Published on: May 24, 2012 Available at: http://www.excelcodex.com/2012/05/excel-intersection-101-implicit-intersection/, 3 pgs.

"Preventing Text from Spilling Over in Excel 2010", Published on: Feb. 28, 2015 Available at: http://www.exceltip.com/excel-editing/preventing-text-from-spilling-over.hlml, 6 pgs.

Kishore, Aseem, "AutoFit Column Widths and Row Heights in Excel", Published on: Sep. 22, 2010 Available at: http://www.online-tech-tips.com/ms-office-tips/autofit-column-widths-and-row-heights-in-excel/, 8 pgs.

Kishore, Aseem, "Group Rows and Columns in an Excel Worksheet to Make Information More Readable", Published on: Jan. 4, 2011 Available at: http://helpdeskgeek.com/office-tips/group-rows-and-columns-in-an-excel-worksheet-to-make-information-more-readable/, 9 pgs.

Spolsky, Joel, "You Suck at Excel with Joel Spolsky", Published on: Sep. 8, 2015 Available at: https://youtu.be/0nbkaYsR94c?t=27m, 3 pgs.

"International Preliminary Report on Patentability Issued in PCT Application No. PCT/US2016/060307", dated Dec. 1, 2017, 8 Pages.

"Second Written Opinion Issued in PCT Application No. PCT/US2016/060307", dated Sep. 11, 2017, 7 Pages.

PCT International Search Report and Written Opinion in International Application PCT/US2016/060307, dated Mar. 23, 2017, 14 pgs.

\* cited by examiner

| | A | B | C | D | E | F | G | H | I |
|---|---|---|---|---|---|---|---|---|---|
| 1 | Name | | | | | | | | |
| 2 | John | John | | | | | | | |
| 3 | Andrew | Andrew | | | | | | | |
| 4 | Kate | Kate | | | | | | | |
| 5 | Ana | Ana | | | | | | | |
| 6 | Kate | Joe | | | | | | | |
| 7 | Joe | | | | | | | | |
| 8 | | | | | | | | | |
| 9 | | | | | | | | | |
| 10 | | | | | | | | | |

B2 — 206
$f_x$ =UNIQUE(A2:A7) — 224
226, 228, 208

Spreadsheet showing Home ribbon with cell E4 selected, formula bar displaying =A2[4:5, 1:2] (308). Range A2:C5 (310) contains Value 1-Value 12 outlined with dashed border. Range E4:F5 (312) contains Value 3, Value 4, Value 7, Value 8 outlined with solid border. Reference 314 points to this area. Reference 206 points to the formula bar area, 208 to the ribbon.

MODERN SPREADSHEET ARRAYS

CROSS-REFERENCE TO RELATED APPLICATIONS

The present application claims priority to U.S. Provisional Patent Application No. 62/250,393, filed Nov. 3, 2015 and entitled "Modern Spreadsheet Arrays," the disclosure of which is hereby incorporated by reference in its entirety.

BACKGROUND

Today, spreadsheet applications treat arrays returned by formulas as a list of independent values (e.g., numbers, text, errors, and images) having no relationship to other values within the list. For example, spreadsheet applications today will only return a single value when a function resolves to an array unless the user specifies the size of the output. Even so, specification of an output may require complex methods such as by entering multiple keystrokes. Additionally, when multiple values are returned by a formula, there is no indication that those values are related. Furthermore, there is currently no mechanism to dependably reference the values as a whole, or in part, when the number of values returned changes. There is also no way for a formula in a cell to resolve to two or more values without some of those values occupying neighboring cells.

SUMMARY

The present disclosure provides a novel approach for creating and referencing arrays as implemented in a spreadsheet application.

In a first aspect, a computer-implemented method for resolving a cell to an array of values is disclosed. The method comprising: receiving a plurality of values; receiving a selection to create an array; and creating the array that includes each of the plurality of values.

In a second aspect, a system comprising: at least one processing unit; and at least one memory storing computer executable instructions that, when executed by the at least one processing unit, cause the system to perform a method is disclosed. The method comprising: receiving a plurality of values; receiving a selection to create an array; and creating the array that includes each of the plurality of values.

In a third aspect, a system comprising: at least one processing unit; and at least one memory storing computer executable instructions that, when executed by the at least one processing unit, cause the system to perform a method is disclosed. The method comprising: receiving a formula at a spreadsheet; and in response to receiving the formula, resolving the formula to an array, wherein the array comprises one or more values, wherein each value is viewable from a cell of the spreadsheet.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

FIG. 2C illustrates an interface for creating an array, according to another example embodiment.

FIG. 2D illustrates an interface storing an array in an anchor cell, wherein the array is created from the examples described in FIG. 2B and FIG. 2C.

FIG. 2E illustrates an interface for creating an array, according to another example embodiment.

FIG. 3A illustrates an interface for referencing an individual element of an array, according to an example embodiment.

FIG. 3B illustrates an interface for referencing multiple elements of an array, according to an example embodiment.

FIG. 5B illustrates an interface storing a collapsed array, according to an example embodiment.

FIG. 5D illustrates an interface indicating a #NOSPILL error, according to an example embodiment.

DETAILED DESCRIPTION

Figure 1:
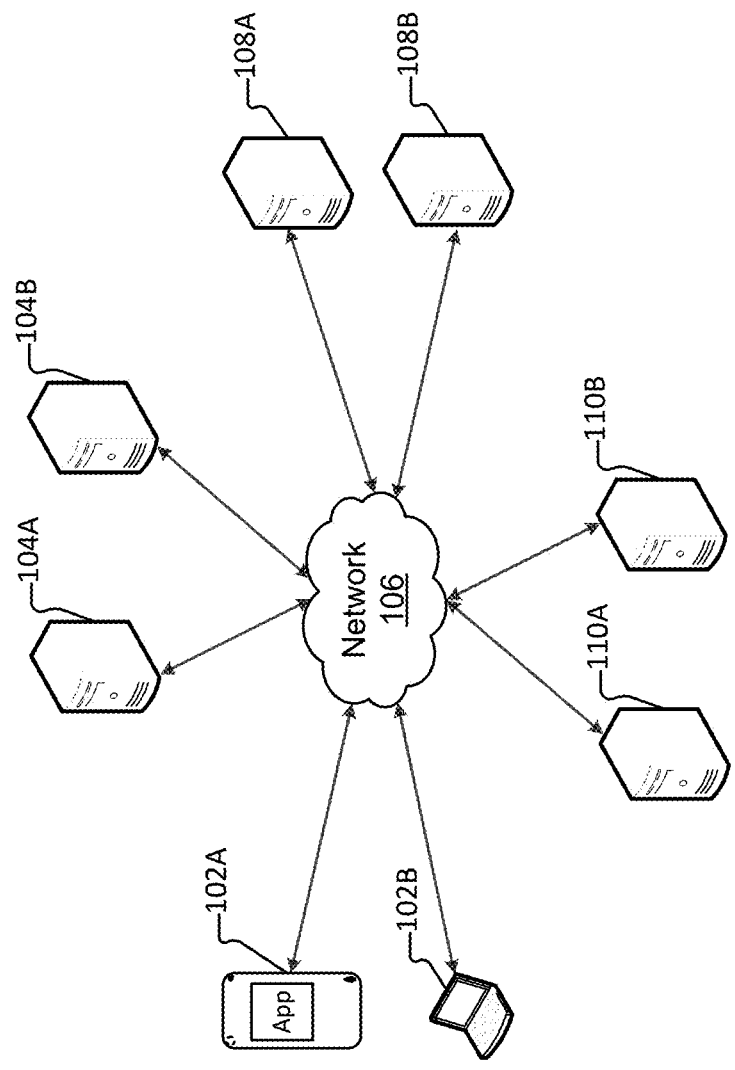
FIG. 1 illustrates a system for implementing compound data types in a spreadsheet application, according to an example embodiment.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The present disclosure provides a novel approach for creating and referencing arrays as implemented in a spreadsheet application such as Excel, which is developed and owned by Microsoft Corporation of Redmond, Wash. Aspects of the present disclosure include, but are not limited to: referencing arrays, creating dynamic arrays, collapsing values of an array into a single cell, expanding or spilling values of an array to a table, referencing one or more values in collapsed arrays, visually indicating no spill errors while maintaining calculation capabilities thereon, and implicit intersection of data.

FIG. 1 illustrates a system 100 for implementing compound data types in a spreadsheet application, according to an example embodiment.

As illustrated, system 100 may include one or more client computing devices 102 (e.g., client computing devices 102A and 102B) that may execute a client version of the disclosed spreadsheet application. In some examples, the client spreadsheet application may execute locally on a client computing device 102. In other examples, a client spreadsheet application (e.g., a mobile app on a thin client computing device 102) may operate with a corresponding server version of spreadsheet application executing on one or more server computing devices. In such embodiments, the client computing device 102 may communicate with the corresponding server version of the spreadsheet application executing on one or more servers (e.g., server 104A and 104B) over a network (e.g., network 106). In still other aspects, rather than executing a client version of a spreadsheet application, the one or more client computing devices 102 may remotely access, e.g., via a browser over a network (e.g., network 106), the spreadsheet application implemented on a server computing device or multiple server computing devices (e.g., in a distributed computing environment such as a cloud computing environment).

In a basic configuration, the one or more client computing devices 102 are personal or handheld computers having both input elements and output elements operated by one or more users. For example, the one or more client computing devices 102 may include one or more of: a mobile telephone; a smart phone; a tablet; a phablet; a smart watch; a wearable computer; a personal computer; a desktop computer; a laptop computer; a gaming device/computer (e.g., Xbox®); a television; and the like. This list is exemplary only and should not be considered as limiting. Any suitable client computing device for executing a client spreadsheet application and/or remotely accessing spreadsheet application may be utilized.

In some aspects, network 106 is a computer network such as an enterprise intranet and/or the Internet. In this regard, the network 106 may include a Local Area Network (LAN), a Wide Area Network (WAN), the Internet, wireless and wired transmission mediums. In further aspects, server computing devices as described herein may communicate with some components of the system via a local network (e.g., an enterprise intranet), whereas such server computing devices may communicate with other components of the system via a wide area network (e.g., the Internet). In addition, the aspects and functionalities described herein may operate over distributed systems (e.g., cloud computing systems), where application functionality, memory, data storage and retrieval, and various processing functions may be operated remotely from each other over a distributed computing network, such as the Internet or an intranet.

As further illustrated, the client computing device 102 may be connected to one or more local databases (e.g., local database 108A and 108B) storing information that can be imported by the client computing device 102. The local database 108 may be a local database accessible over, for example, a local area network (e.g, network 106). The local database 108 may be maintained and operated by a local party affiliated with the client computing device 102 and can store information that can be imported by the spreadsheet application. The databases could also be located on the same device 102 as the spreadsheet, such as, for example, a database locally stored on a user's desktop.

As further illustrated, the client computing device 102 may be connected to one or more third party databases (e.g., database 110A and 110B) storing information that can be imported by the client computing device 102. The third party database 110 may be accessible over, for example, a Wide Area Network such as the Internet (e.g, network 106). The third party database 110 may be maintained and operated by any third party company or organization and may store information that can be imported by the spreadsheet application.

As should be appreciated, the various devices, components, etc., described with respect to FIG. 1 are not intended to limit the systems and methods to the particular components described. Accordingly, additional topology configurations may be used to practice the methods and systems herein and/or some components described may be excluded without departing from the methods and systems disclosed herein.

Figure 2A:
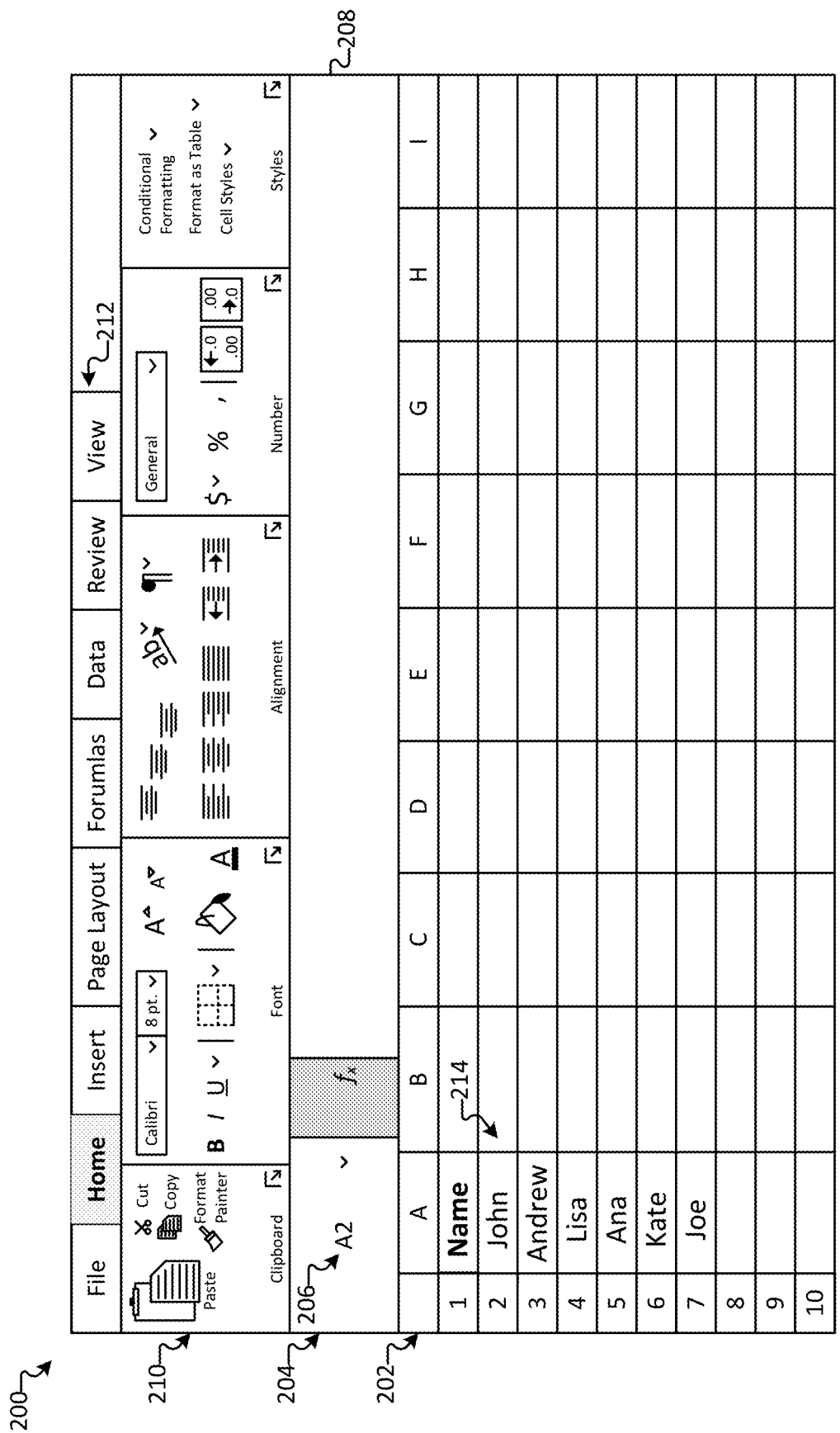
FIG. 2A illustrates an example interface showing a list of values organized in a column.

FIG. 2A illustrates an example interface 200 showing a list of values organized in a column.

As described herein, aspects of the present disclosure provide methods and systems for more intuitively creating arrays. In embodiments that will be described in further detail herein, arrays can be created by selecting a set of values stored in the spreadsheet and selecting a create array option or by defining the array through a formula definition.

As illustrated, an example interface 100 of a spreadsheet application is provided. Interface 100 includes a spreadsheet 202 having a plurality of cells, a navigation ribbon 204 (including a cell identifier 206 and a formula bar 208), and a toolbar 210. In some embodiments, the toolbar 210 is part of the navigation ribbon 204. Interface 100 further includes a plurality of tabs 212 for accessing various aspects and operations of the spreadsheet application.

As further illustrated by FIG. 2A, a list of six name values 214 are stored in the spreadsheet 202. In this example, the six values 214 are stored in separate and unrelated cells (e.g., cells A2-A7). As will be described in further detail with reference to FIG. 2B and FIG. 2C, the values 214 may be converted into an array in which the cells indicate a relationship among the values and calculations can be performed on the entire array.

Figure 2B:
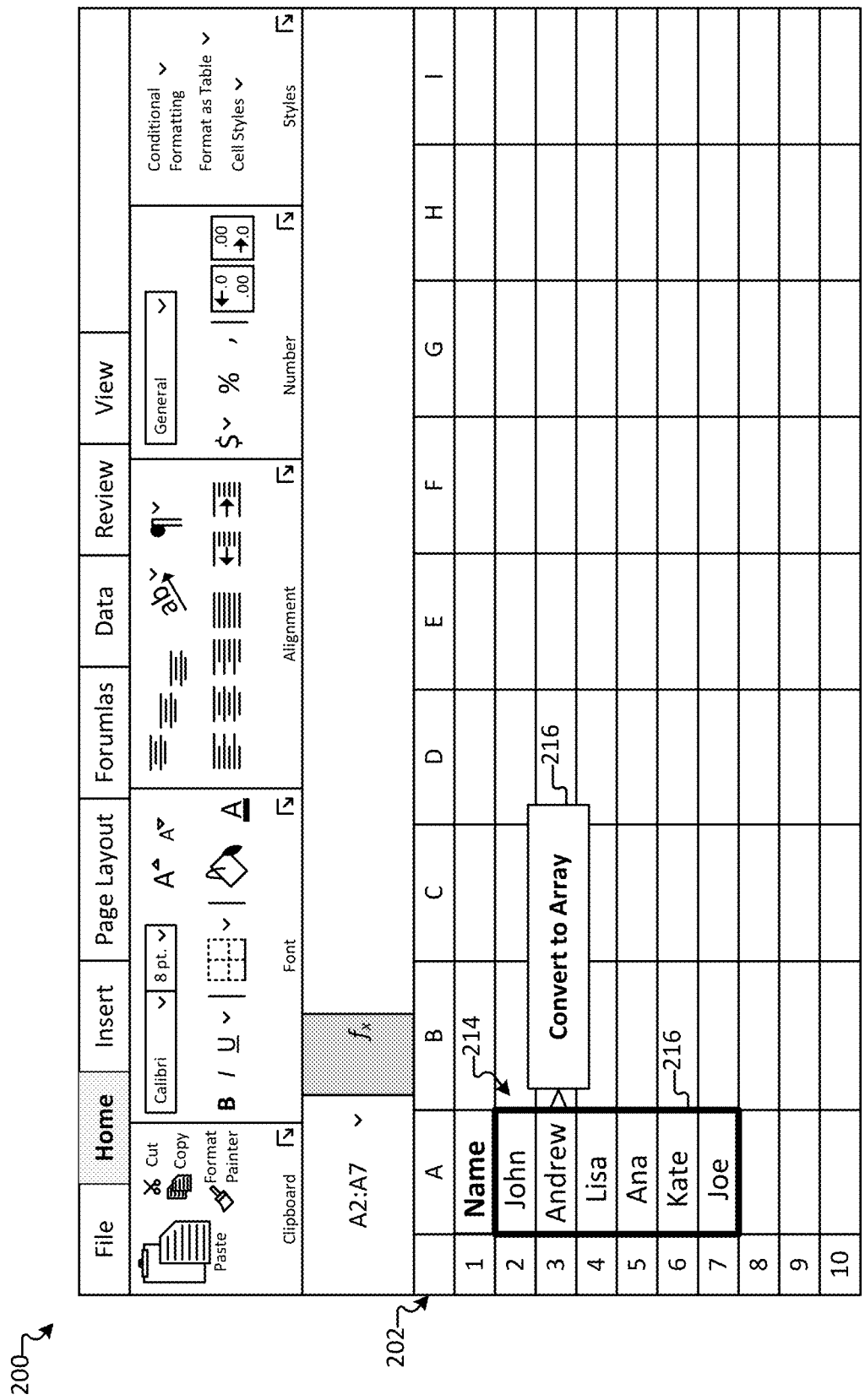
FIG. 2B illustrates an interface for creating an array, according to an example embodiment.

FIG. 2B illustrates an interface 200 for creating an array, according to an example embodiment.

Similar to FIG. 2A, FIG. 2B illustrates an interface 200 storing name values 214 in cells A2-A7 of the spreadsheet 202. In this example, an array may be created by selecting cells A2-A7, as indicated by cell selection 216, and selecting a convert to array option 218. The convert to array option 218 may be a menu that is displayed in response to a right-click or other selection of the cell selection 216. Based upon selection of the convert to array option 218, a 6×1 dimension array that includes, as elements, each value stored in cells A2-A7 may be created. In some embodiments, the array may be anchored to a single cell and expanded across multiple cells, wherein each element of the array is stored in a different cell. Alternatively, the spilled array may be stored in a single, root cell and visually spilled across multiple cells. In such an embodiment, the value may actually be stored in the root cell, and only visually displayed in the spilled cell. Alternatively, the value may be stored in the individual cell in which the array is spilled and also have a pointer back to the root cell in which the array is stored (as well as flags that indicate to the spreadsheet application that the array is anchored). Furthermore, and as will be described in further detail herein, the array may be collapsed and therefore stored in a single cell. In such embodiments, the array may be stored in a cell corresponding to the upper leftmost cell of the array, such as, for example, cell A2. In other embodiments, an option to select the cell in which to store the array may also be provided.

Figure 2C:
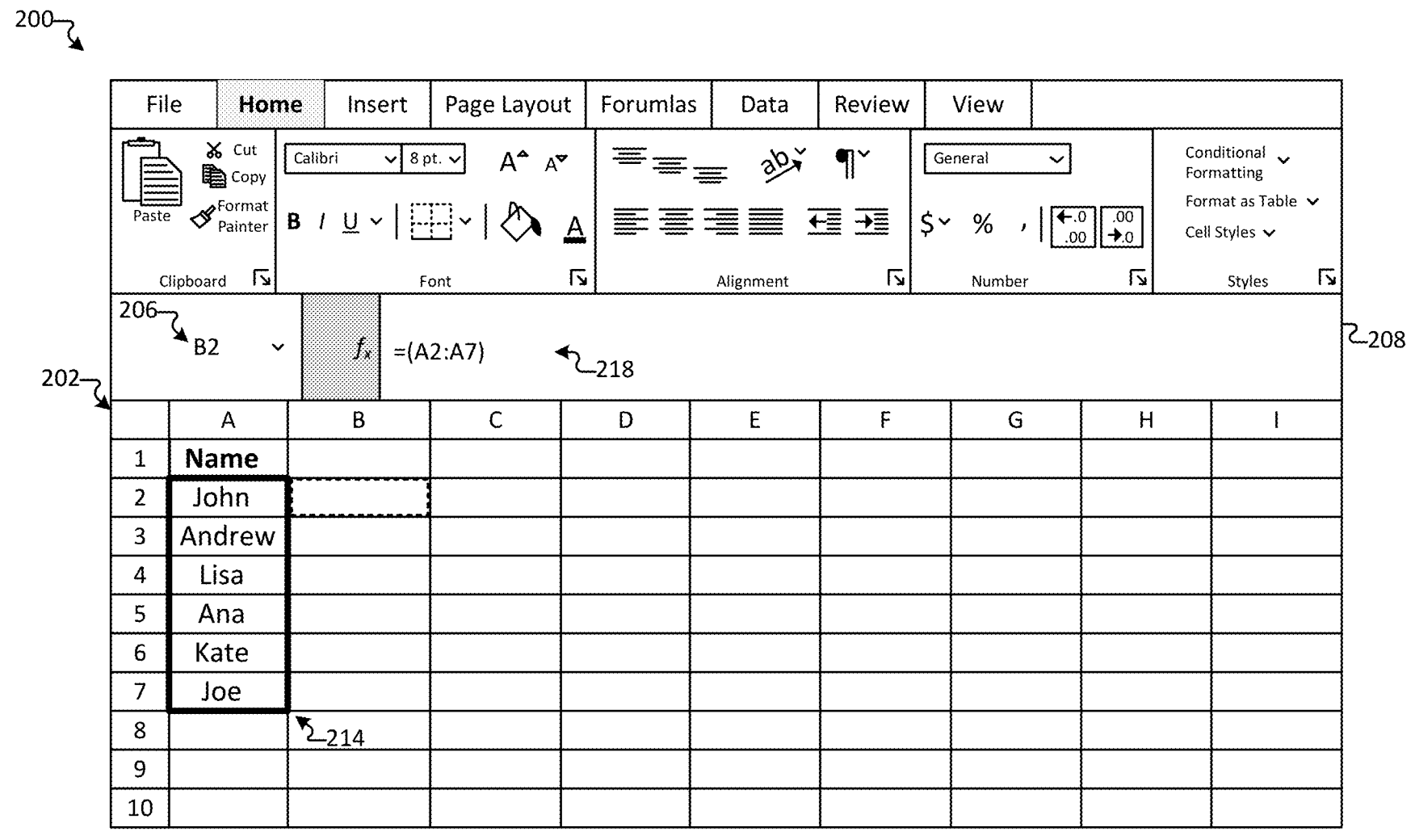

FIG. 2C illustrates an interface 200 for creating an array, according to another example embodiment.

Figure 2D:
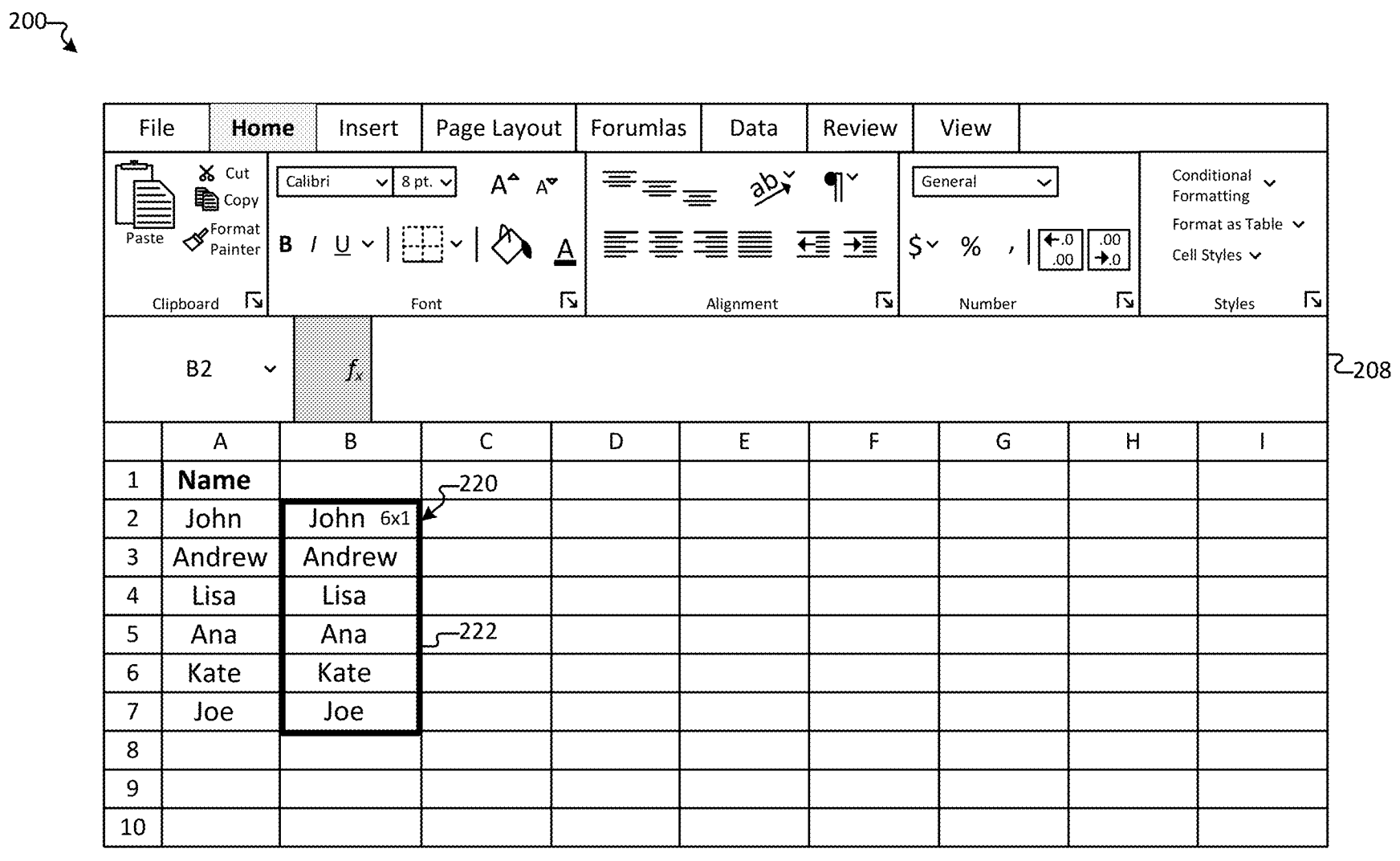

Similar to FIG. 2A and 2B, FIG. 2C illustrates an interface 200 storing name values 214 in cells A2-A7 of the spreadsheet 202. According to aspects of the present disclosure, an array can also be created through a formula that identifies a range of values. In particular, the formula 218 (e.g., "=(A2:A7)") provided in the formula bar 208 may be used to create a 6×1 dimension array using values stored in cells A2 through A7. As indicted by the cell identifier 206, the newly created array is stored in cell B2, as illustrated in FIG. 2D. Although in this example, the array function definition includes cells A2 through A7, in other embodiments, the array function definition may be created independent from values stored in the spreadsheet. In such an embodiment, the array function may include a definition of each element of the array, such as, for example, "=Array(Value 1, Value 2, Value 3)" in order to create a 3×1 dimension array. Although a particular syntax is illustrated in these examples, it is understood that the present disclosure is not to be limited by such a particular syntax and any suitable syntax may be used.

FIG. 2D illustrates an interface 200 storing an array in an anchor cell, wherein the array is created from the examples described in FIG. 2B and FIG. 2C.

In particular, the 6×1 dimension array 220 is stored in cell B2. As further illustrated, the array, stored in a single cell, is expanded over (or spilled to) multiple cells (e.g., cells B2 through B7). In some embodiments, the array is spilled to multiple cells by default, and in other embodiments, the array is collapsed into a single cell by default. Embodiments in which an array is collapsed into a single cell are also described in further detail herein. Furthermore, in this embodiment, an outline 222 illustrating the boundaries and the size of the array is also displayed, indicating each element of the array.

Alternatively or additionally, an array may be created by a formula that returns multiple values (e.g., the formula "=B1:C22" would return an array) or a list of values. Furthermore, copying and pasting a list of data (e.g., importing a file having a .CSV or other format) may also be stored as an array.

Furthermore, if a value in an array that is spilled across multiple cells is selected, the formula bar may display, for example, the cell in which the array is stored (e.g., the anchor cell) and the element of the array. Accordingly, an example formula definition of cell B4 in FIG. 2D might be "=B2[3]" which indicates that the value shown in cell B4 is the third element of the array stored in cell B2. In some embodiments, this formula is transient and thus, if the user selects, for example, the formula bar, that formula may disappear since the value is not stored in cell B4. In another example, the formula bar may display a token indicating the value is an element of an array (e.g., for a selection of any cell storing a value of the array), the address of the root cell of the array, text or an icon showing the selected value is part of an array, etc.

FIG. 2E illustrates an interface for creating an array, according to another example embodiment.

As described herein, aspects of the present disclosure describe the creation of an array through an array function that identifies a range of values. In an example, a UNIQUE function may also be used to create an array. For example, the "=UNIQUE(A2:A7)" function 224 provided in the formula bar 208 may resolve to a 5×1 dimension array that includes, as elements of the array, only unique values of the values stored in cells A2 through A7. In other words, the resultant array includes only non-recurrent values. Accordingly, as illustrated in FIG. 2E, six name values are stored in cells A2 through A7: John, Andrew, Kate, Ana, Kate, and Joe, wherein the name "Kate" appears twice. The disclosed "UNIQUE" function therefore will create an array including only a single occurrence of each value. Accordingly, the resultant array 226 stored in cell B2, as indicated by the cell identifier 206, includes five, non-recurring values: John, Andrew, Kate, Ana, and Joe. Also illustrated in this example is an outline 228 illustrating the size of the array is also displayed in order to visually indicate the size of the array as well as each element stored therein. Although the array that results from the function in the present example is a 5×1 dimension array, it is understood that this is not intended to be limiting and other such array sizes may also result based at least in part on the values input.

Figure 2F:
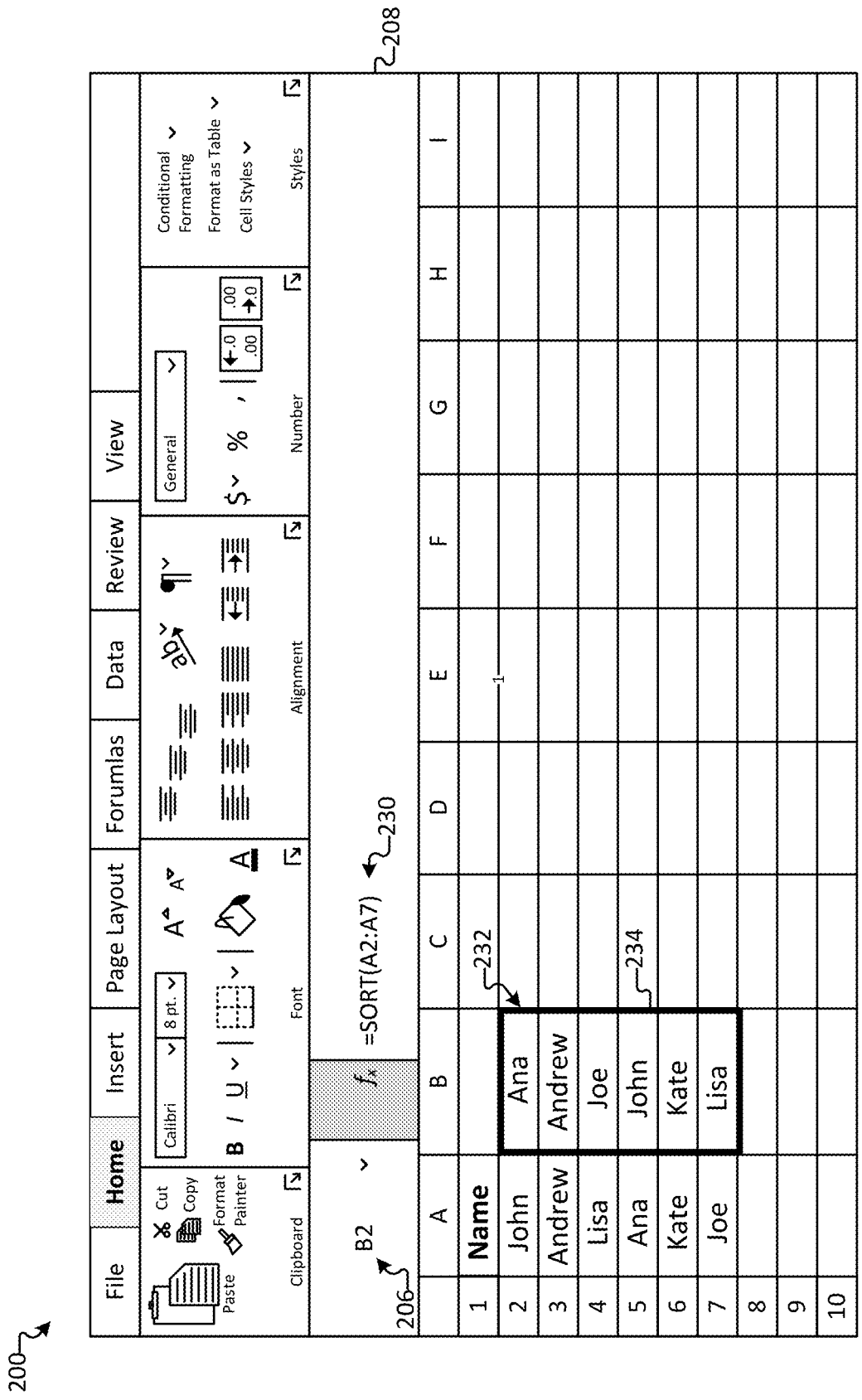
FIG. 2F illustrates an interface for creating an array, according to another example embodiment.

FIG. 2F illustrates an interface 200 for creating an array, according to another example embodiment.

As described herein, aspects of the present disclosure describe the creation of an array through an array function that identifies a range of values. In an example, a SORT function may also be used to create an array. For example, the "SORT(A2:A7)" function 230 provided in the formula bar 208 may resolve to a 6×1 dimension array that includes, as elements of the array, sorted values of the values stored in cells A2 through A7. In other words, the resultant array includes the values stored in cells A2 through A7 in a sorted order. In some embodiments, the sort order is based on an alphabetical order and in other embodiments the sort order is based on a numerical ascending or descending order. In other embodiments, other sort orders are used and may be defined by the user. Accordingly, as illustrated in FIG. 2F, six name values are stored in cells A2 through A7: John, Andrew, Lisa, Ana, Kate, and Joe. In this particular embodiment, the disclosed "SORT" function will create an array 232 that includes those values in alphabetical order. Accordingly, the resultant array 232 stored in cell B2, as indicated by the cell identifier 206, includes alphabetically ordered values: Ana, Andrew, Joe, John, Kate, and Lisa. Also illustrated in this example is an outline 234 illustrating the size of the array is also displayed in order to visually indicate the size of the array as well as each of the values stored therein. Still further, the resultant array 232 is applied to the cells A2 through A7. In other examples, the SORT function may be used on a preexisting array to sort the elements stored therein. For example, the function "=SORT(B2.array)" may be applied to sort the elements of an array stored in cell B2 illustrated in FIG. 2E. Accordingly, a user need not have any knowledge of the size or shape of the array stored in cell B2. Rather, the user may merely reference the array using a shorthand formula. Accordingly, users may more easily perform calculations on the entirety (or a subset) of the results of formulas that resolve to an array of values. In embodiments in which the array spans multiple rows or columns, the example SORT function may accept multiple arguments describing how to sort the array. For example, individual arguments may be provided for each column or row so that sorting may be performed for each row. Alternatively or additionally, the SORT function may sort the values in a predetermined or provided order. In an example, the spreadsheet application or user might specify arguments that sort the first column of values alphabetically and sort the second column of values alphabetically, but independently from the first column. In an alternative embodiment, the spreadsheet application or user might specify arguments that sort the first column of values and the second column of values together. Thus, the sorting may result in an order in which some values are stored in different columns.

Still further, when a cell resolves to an array in spreadsheet applications today, logic is used to return only a single value (using, for example, a process referred to as implicit intersection, which is described in further detail herein). However, as described and illustrated with reference to FIG. 2E and FIG. 2F, arrays returned by formulas in the present disclosure resolve and can be spilled to neighboring cells or retained by the resolving cell in a collapsed state.

Figure 2G:
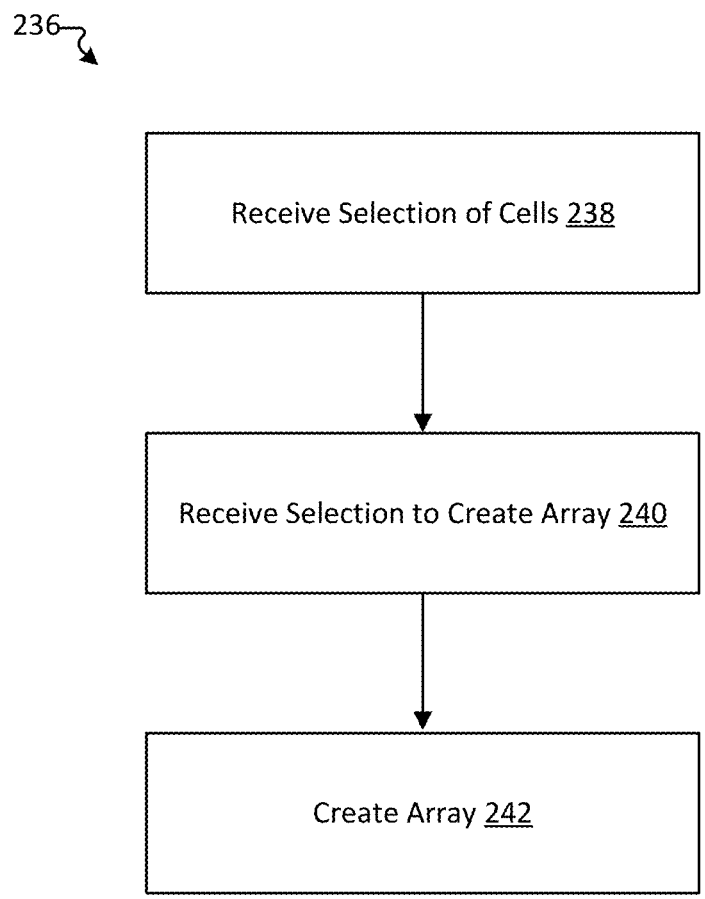
FIG. 2G illustrates an example method for creating an array, according to an example embodiment.

FIG. 2G illustrates an example method 236 for creating an array, according to an example embodiment.

Method 236 beings with receive selection of cells operation 238, where a spreadsheet application may receive a selection of one or more cells. In an example, the spreadsheet application may receive a selection of cells storing values. In an example, this may be received in response to a user's selection of one or more cells.

At the receive selection to create array operation 240, the spreadsheet application may receive a selection to create an array from the one or more cells selected in operation 238. In an example, a convert to array option, such as the convert to array option 218 may be selected and received by the spreadsheet application. As described herein, the convert to array option 218 may be a menu that is displayed in response to a right-click or other selection of one or more cells. In other embodiments, another user interface may be used to create an array. Furthermore, the convert to array option may also provide the option to identify the cell in which the array is to be stored.

At the create array operation 242, based on a convert to array option selection in operation 240, the spreadsheet application may create an array from the one or more values selected in operation 238. Additionally, the array is stored in and anchored to the cell identified in operation 240. In some embodiments, the array is viewed in an expanded or spilled view so that each element spills to an individual cell. In such an embodiment, the spreadsheet application may place an outline around the border of the array to denote the size and shape of the array as well as the contents contained therein. In other embodiments, the array is stored in a single cell.

Figure 2H:
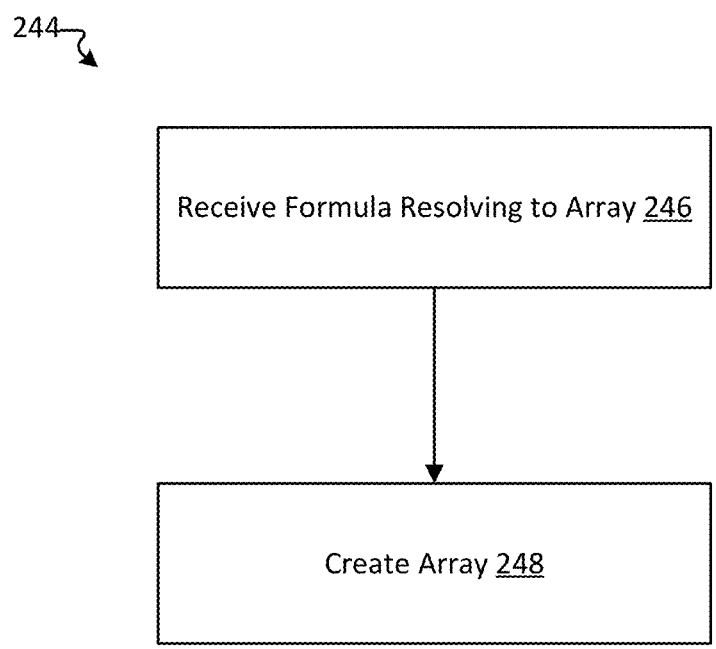
FIG. 2H illustrates an example method for creating an array, according to another example embodiment.

FIG. 2H illustrates an example method 244 for creating an array, according to another example embodiment.

The method 244 begins at the receive formula resolving to an array operation 246, where the spreadsheet application receives a formula that resolves to an array. Such a formula may be received, for example, in the formula bar (e.g., formula bar 208) or in a cell in which the array is to be stored. The formula to create an array may be, for example, "=A1:A7" or "=Array("Joe", "John", "Andrew")" where the array function receives, as arguments, one or more cell references or values. Another formula to create an array may be "=Unique( )" where the Unique function receives, as arguments, one or more cell references or values. As described herein, the Unique function resolves to an array that includes, as elements of the array, non-recurrent values. Yet another example formula to create an array may be a "=Sort( )" where the Sort function receives, as arguments, one or more cell references or values. As described herein, the Sort function resolves to an array that includes, as elements of the array, the referenced values in a sorted order (e.g., alphabetical, ascending, descending, etc.).

At the create array operation 248, based on receiving a formula to create an array and one or more cell references or values, as described in operation 246, the spreadsheet application may create an array. The array may be created from the one or more values of the referenced cells or values returned by its constituent functions. In an example, new values may be returned. For example, the formula "=(A1:A10)*2" would return the doubled values contained in the range A1:A10. Additionally, the array is stored in and anchored to the cell identified in the cell identifier (e.g., cell identifier 206) or the cell in which the formula was directly entered. In some embodiments, the array is viewed in an expanded view so that each element spills to an individual cell. In such an embodiment, the spreadsheet application may place an outline around the border of the array to denote the size and shape of the array as well as the contents contained therein. In other embodiments, the array is stored in a single cell.

Figure 3A:
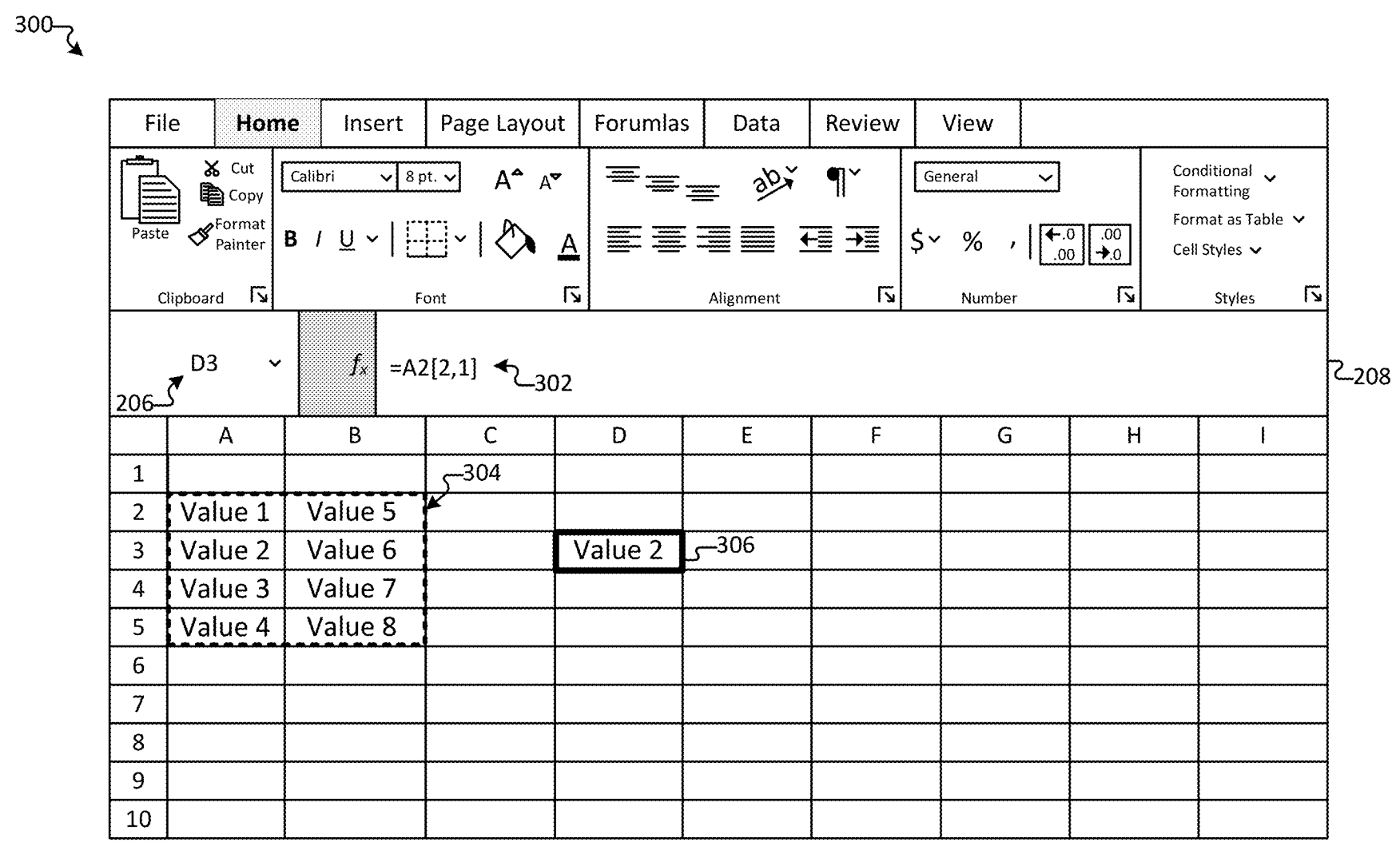

FIG. 3A illustrates an interface 300 for referencing an individual element of an array, according to an example embodiment.

Aspects of the present disclosure provide the ability to reference an individual element in an array. In some embodiments, this may be done by referencing the cell to which a particular element has spilled. In an example, a 4×2 dimension array stored in cell A2 may be spilled down the column to four cells. Accordingly, any one of those cells can be referenced. In an example, the formula "=A4" could be used to reference the spilled value displayed in cell A4, which is in the third row, first column of the array stored in A2.

In another embodiment, a single element of an array may be referenced using a structured reference. In this example, the formula 302 (e.g., "=A2[2,1]") provided in the formula bar 208 references the array 304 stored in cell A2, and the array element stored in row 2 and column 1. Accordingly, the formula 302 (e.g., "=A2[2,1]") references "Value 2" of the array 304. Furthermore, the result of the formula 302 is stored in cell D3 306, as indicated by the cell identifier 206. Accordingly, "Value 2" is stored in cell D3 306.

Furthermore, if the array is a single dimension (e.g., a 4×1 dimension array or a 1×7 dimension array), one reference value could be used to reference an element of the array. For example, the formula "=D2[3]" could be used to reference the third element of a 4×1 dimension array stored in cell D2. Such referencing may also be used on a collapsed array, as will be described in further detail herein.

FIG. 3B illustrates an interface 300 for referencing multiple elements of an array, according to an example embodiment.

Aspects of the present disclosure provide the ability to reference multiple elements of an array. In some embodiments, this may be done by referencing the cells to which one or more elements of the array has spilled. In an example, a 4×1 dimension array stored in cell A1 may be spilled across a row of four cells. Accordingly, any one or more of those cells can be referenced. In an example, a formula "=A2:A4" could be used to reference the second through fourth elements of the array.

In another embodiment, multiple elements of an array may be referenced using a structured reference. In this example, the formula 308 (e.g., "=A2[4:5, 1:2]") provided in the formula bar 208 references the 4×3 dimension array 310 stored in cell A2. In particular, the formula 308 references the array elements stored in rows 4 and 5, and columns 1 and 2 the array 310. Accordingly, the formula 308 (e.g., "=A2 [4:5, 1:2]") references four values: Value 3, Value 4, Value 7, and Value 8 of the array 310. In this example, the referenced result is a 2×2 dimension array 312 stored in cell E4 314, as indicated by the cell identifier 206. Accordingly, the four resulting values of the referenced array elements are returned as an array 312 and stored in cell E4 314, for example. In this embodiment, the array E4 312 is in turn spilled to the range E4:F5. In other embodiments, the referenced elements may be stored as individual values and not as an array.

Furthermore, if the array is a single dimension (e.g., a 4×1 dimension array or a 1×7 dimension array), a range could be used to reference multiple elements of the array. For example, the formula "=D2[3:6]" could be used to reference the third through sixth elements of an array stored in cell D2.

Furthermore, array references themselves can also be the result of formulas. For example, the formula "=A1[SUM (Z1, Z2)]" may resolve the sum function to a number, which may be used as an indicie of the array.

Figure 3C:
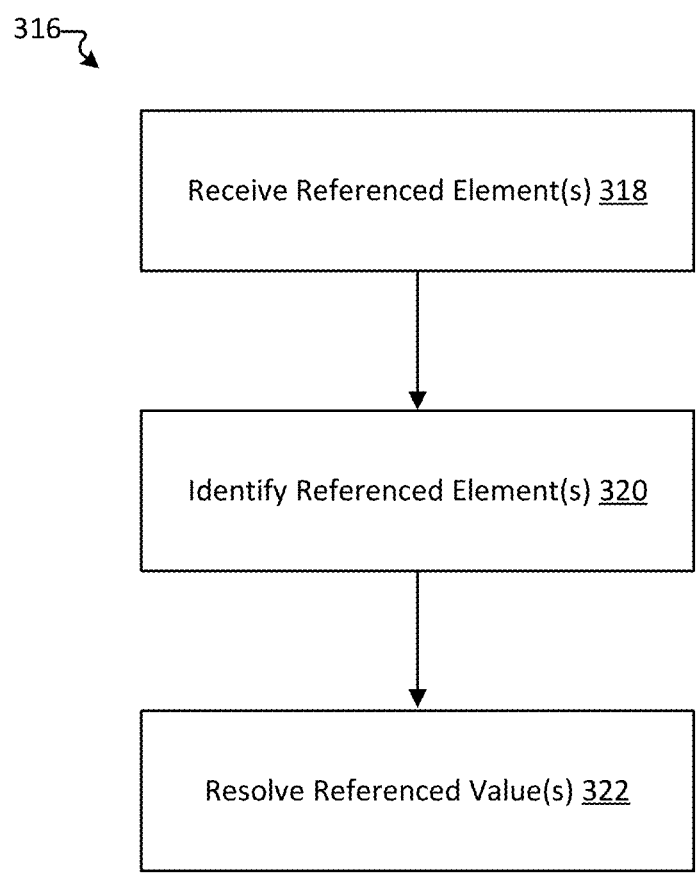
FIG. 3C illustrates a method for referencing arrays, according to an example embodiment.

FIG. 3C illustrates a method 316 for referencing arrays, according to an example embodiment.

The method 316 starts at the received referenced element(s) operation 318, where the spreadsheet application receives a reference to one or more elements of an array stored in the spreadsheet. In an example, one or more elements of an array may be referenced by referencing the cell to which the array element is stored or by a structured reference of the array, as described in FIG. 3A and FIG. 3B. For example, one or more cells may be referenced in the formula "=A3" to obtain the value stored in cell A3. In another example, the formula "=A3:A5" obtains the values stored in cells A3, A4, and A4. As described herein, array elements may also be referenced by a structured reference, which references the position of the element within the array. In such an example, the formula "=A1[5]" references the fifth element of the array stored in cell A1. Alternatively, multiple structured references may be used to obtain multiple values. For example, the formula "=A1[4:5, 1:2]" references the values stored in rows four and five and columns 1 and 2, thereby resulting in a 2×2 dimension array.

In the identify referenced element(s) operation 320, the spreadsheet application identifies each element referenced in operation 318 and each corresponding value. For example, if a cell is referenced, the spreadsheet application parses the formula to identify each referenced cell and identifies each value stored in each identified cell. If an array element is referenced via a structured array, the spreadsheet application parses the formula to identify each referenced element and identifies each corresponding value.

At the resolve referenced element(s) operation 322, the spreadsheet application resolves each value identified in operation 320. For example, if one or more cells or elements (or both) are referenced, the corresponding values are resolved in the spreadsheet. In some embodiments, if more than one cell or element is referenced, then the corresponding resultant values may be resolved in the spreadsheet as an array.

Figure 4A:
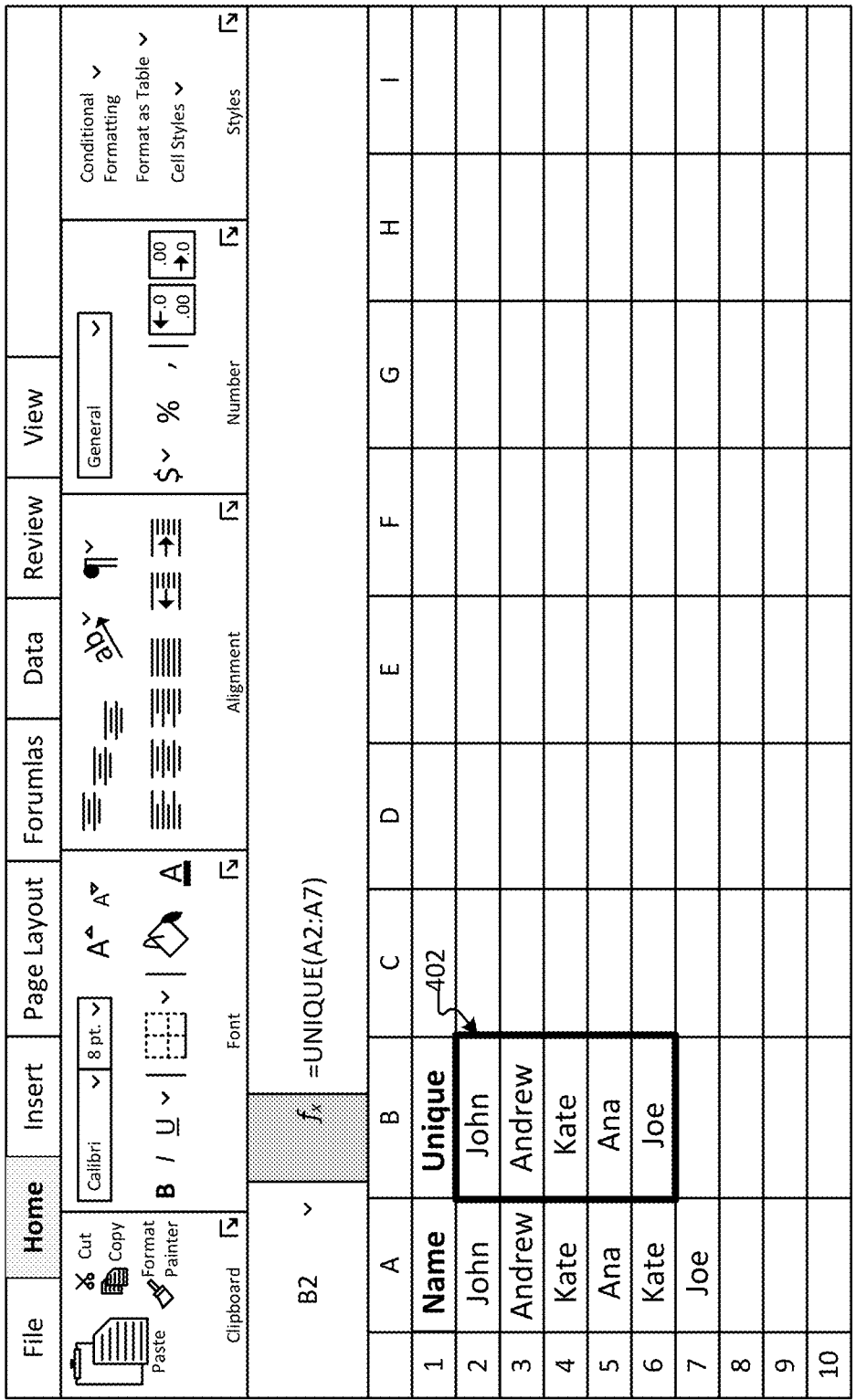
FIG. 4A illustrates an interface storing a dynamic array, according to an example embodiment.

FIG. 4A illustrates an interface 400 storing a dynamic array, according to an example embodiment.

Aspects of the present disclosure are further directed to the concept of dynamic arrays. Dynamic arrays are arrays that automatically resize or automatically revise based on changes in input data. For example, an array may be created from values stored in the spreadsheet. If one or more of those values are deleted or one or more values are added to that input data, the array will automatically resize. Furthermore, if one or more of the input values are edited, the array will automatically revise to the reflect the edited value. This type of array is referred to herein as a dynamic array. In some embodiments, any array can be a dynamic array. Alternatively, some arrays may be static, and therefore do not change because, for example, the input values are statically provided.

In the example illustrated in FIG. 4A, six values are stored in column A and a UNIQUE array 402 created from those values is stored in column B. As described herein, an array created from the UNIQUE function results in an array including non-recurrent values. Accordingly, the array 402 includes five of the six values stored in column A (the array 402 does not include the repeated value "Kate").

Figure 4B:
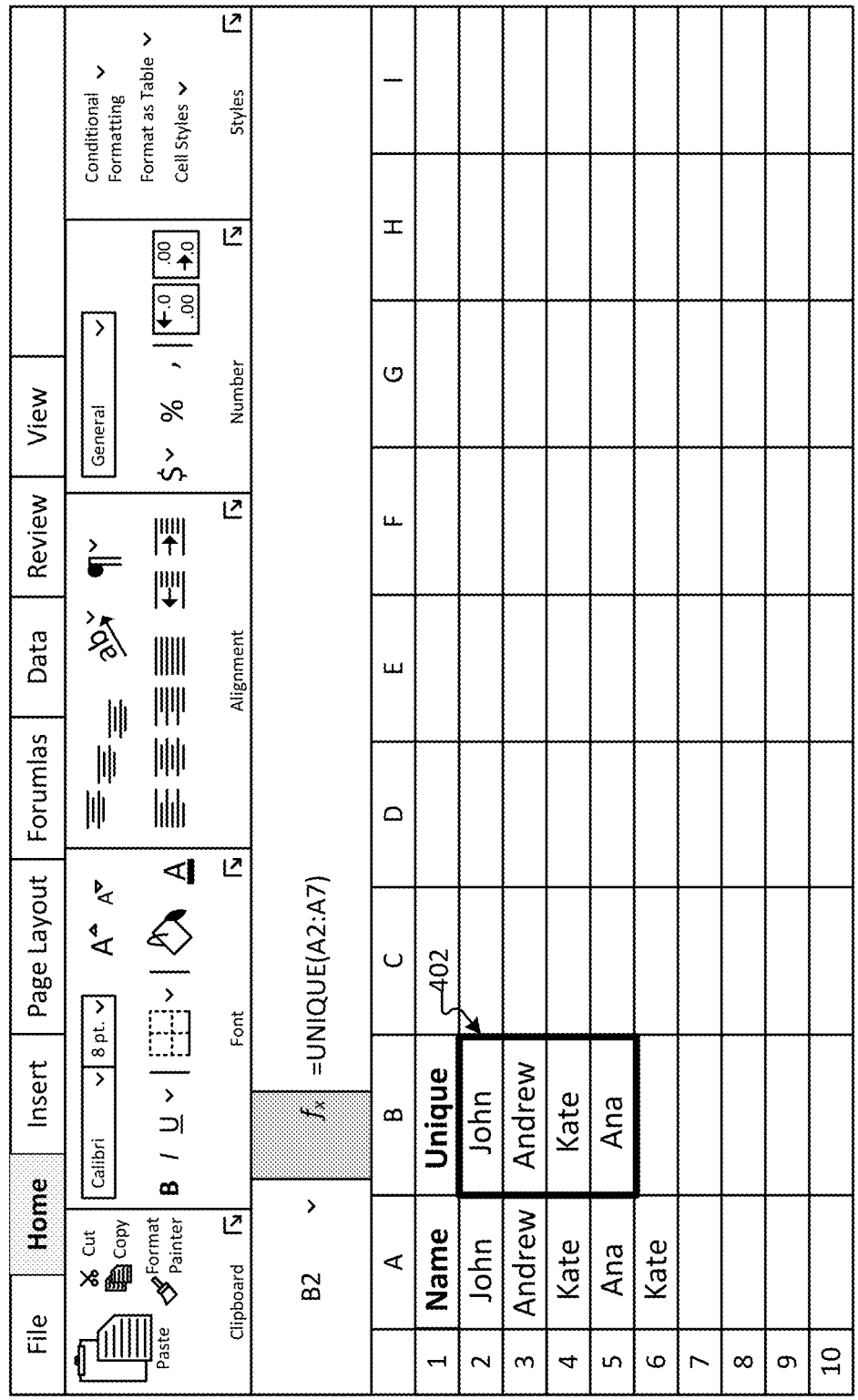
FIG. 4B illustrates an interface storing a spilled array that is dynamically updated, according to an example embodiment.

FIG. 4B illustrates an interface 400 storing a spilled array that is dynamically updated, according to an example embodiment.

In this example, the value "Joe" has been deleted from column A. Based on the concept of dynamic arrays as described herein, the value "Joe" is accordingly no longer returned by the Unique function and therefore is no longer returned by the dynamic array 402 stored in cell B2. If a value is added to cell A7, for example, the resultant dynamic array would include that new value, assuming that new value is not a repeated value. Furthermore, if an existing value in range A2:A7 is edited, the resultant dynamic array would update and would include the edited value if it were not a repeated value.

Figure 4C:
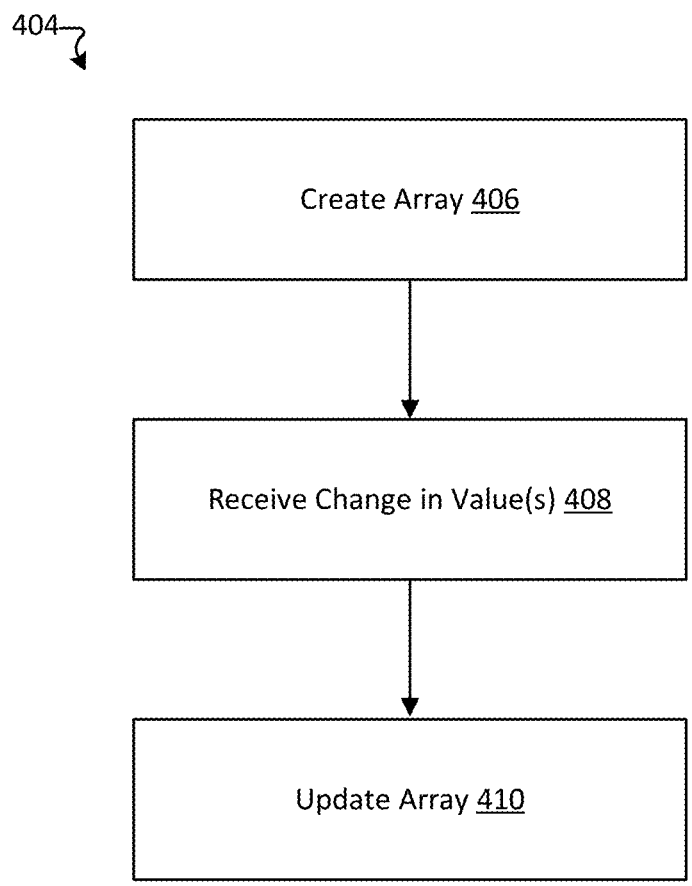
FIG. 4C illustrates a method for implementing dynamic arrays, according to an example embodiment.

FIG. 4C illustrates a method 404 for implementing dynamic arrays, according to an example embodiment.

The method 404 starts at the resolve array operation 406. As described herein, an array may be resolved by a function or from one or more values stored in one or more cells of the spreadsheet.

At the receive change in value(s) operation 408, one or more values that are the input data of the array is changed. In some embodiments, the values may be edited, or deleted and in other embodiments, new values may be added.

At the update array operation 410, the spreadsheet application updates the array based on updates to the input data. In particular, if one or more input values are edited, those values are correspondingly edited in the array. If one or more input values are deleted, those values are also deleted from the array. If one or more new input values are added, those values are also added to the array. If, however, the array is created using a unique function and a value is edited or added so that it is a recurring value, that value is not updated in the array.

Figure 5A:
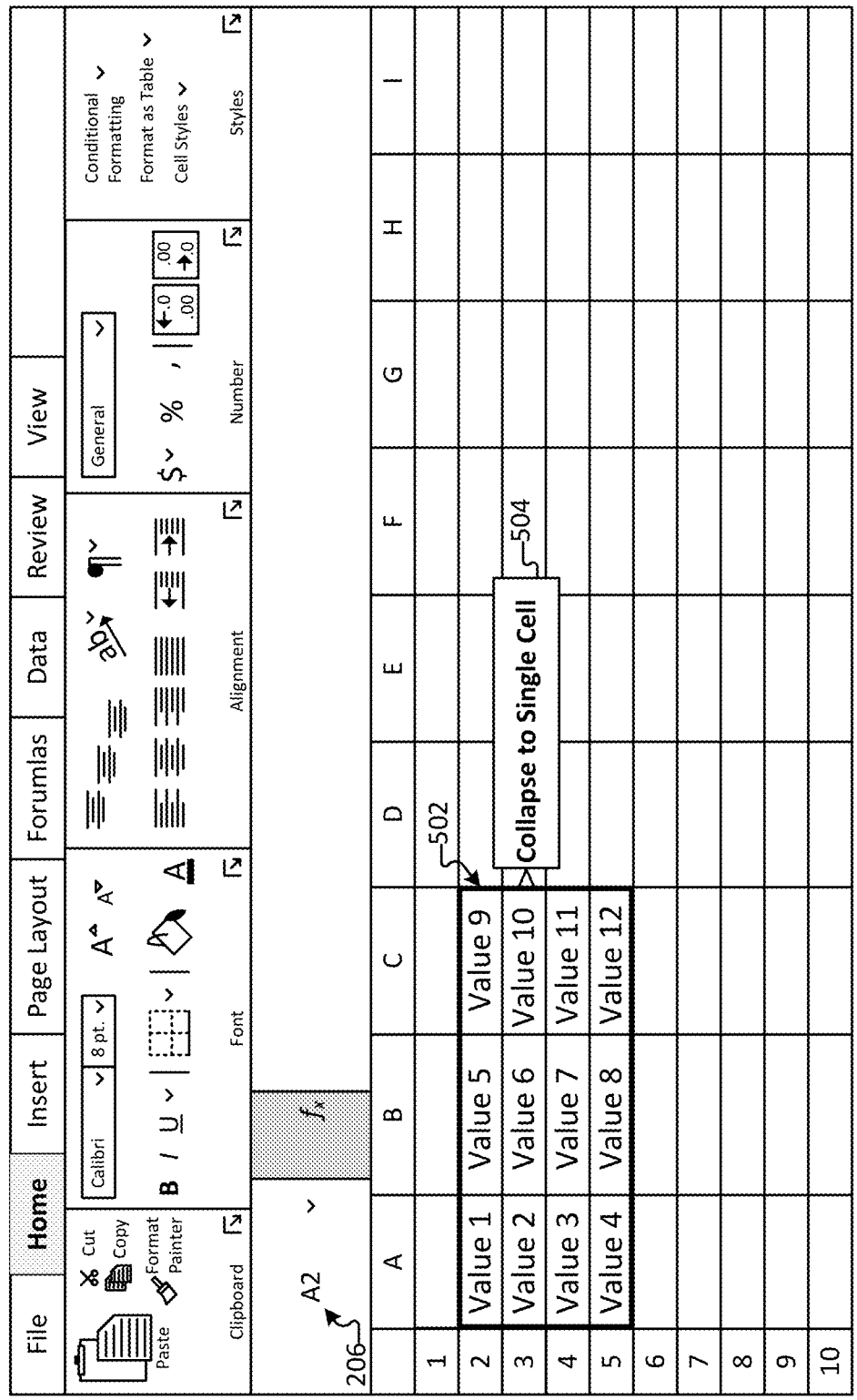
FIG. 5A illustrates an interface 500 storing an array, according to an example embodiment.

FIG. 5A illustrates an interface 500 storing an array, according to an example embodiment.

As illustrated, the interface 500 includes a 4×3 dimension array 502 stored in cell A2, as indicated by the cell identifier 208. As illustrated, the elements of the array 502 are viewable over multiple rows and columns. In particular, the array 502 spans rows two through five and columns A through C. As described herein, the array may be anchored to a single cell and expanded over (spilled to) the multiple cells (and may be expended over multiple rows and columns as illustrated in this example). In some embodiments, each element of the array is stored in a different cell and therefore may be referenced by a cell reference to that cell. Alternatively, the spilled array may be stored in a single, root cell (e.g., cell A2) and visually spilled across multiple cells. In such an embodiment, the value may be stored in the individual cells to which the array is spilled and also have a pointer back to the root cell in which the array is stored (as well as flags that indicate to the spreadsheet application that the array is anchored).

In this example, the array 502 can be collapsed into a single cell by, for example, selection of a collapse array option 504. In this example, the collapse array option 504 is a menu that is displayed in response to a right-click or other selection of the array 502. In other example embodiments, the collapse array option 504 may be displayed in response to a selection in another menu.

Collapsing arrays provides the ability to simplify a spreadsheet by minimizing the contents of an entire array into a single cell and visually indicating that an array is present in the collapsed cell. This is particularly useful when, for example, performing successive matrix manipulations or calculations on large amounts of data in which the user does not need to see each value in the spreadsheet.

Figure 5B:
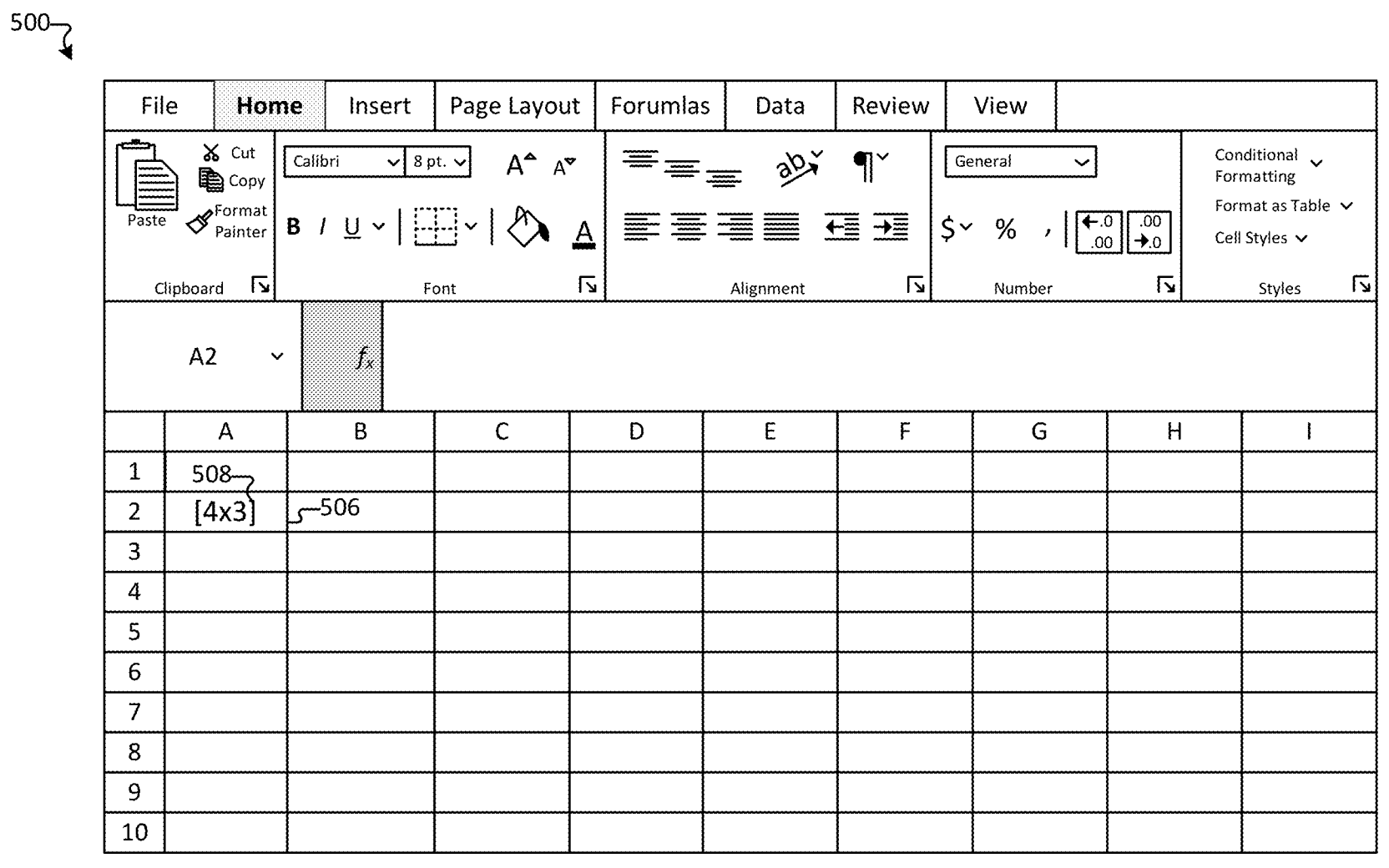

FIG. 5B illustrates an interface 500 storing a collapsed array, according to an example embodiment.

Based on selection of, for example, the collapse array option 504, each element of the array 502 illustrated in FIG. 5A is collapsed into cell A2 506. The array is collapsed into the cell in which the array is stored or anchored, which, in this example, is cell A2 506. Furthermore, an array symbol 508 (e.g., "[4×3]") denoting the size of the array is displayed in cell A2 506. In some embodiments, hovering over the array symbol 508 or selecting an option to view the array 502 may display a user interface in which part or all of the elements of the collapsed array can be viewed.

The collapsed array 502 may be re-expanded (or spilled) back to multiple cells, as illustrated in FIG. 5A. In some embodiments, this is done by double-clicking the array symbol 508, by a right-click of the array symbol 508 and selection of an expansion option, or by another method.

Furthermore, aspects of the present disclosure further include the ability to reference one or more elements of the collapsed array. As described herein, collapsing an array can be beneficial for many reasons, however it is noted that the array may still be calculated upon and one or more elements of the array may be referenced despite not being fully displayed. Furthermore, knowledge of the contents of the array may not be necessary when making references to it. For example, retrieving the last value of the array may be done using a simple reference formula. It is understood that although an array is collapsed, it is nonetheless capable of being calculated upon and referenced.

Figure 5C:
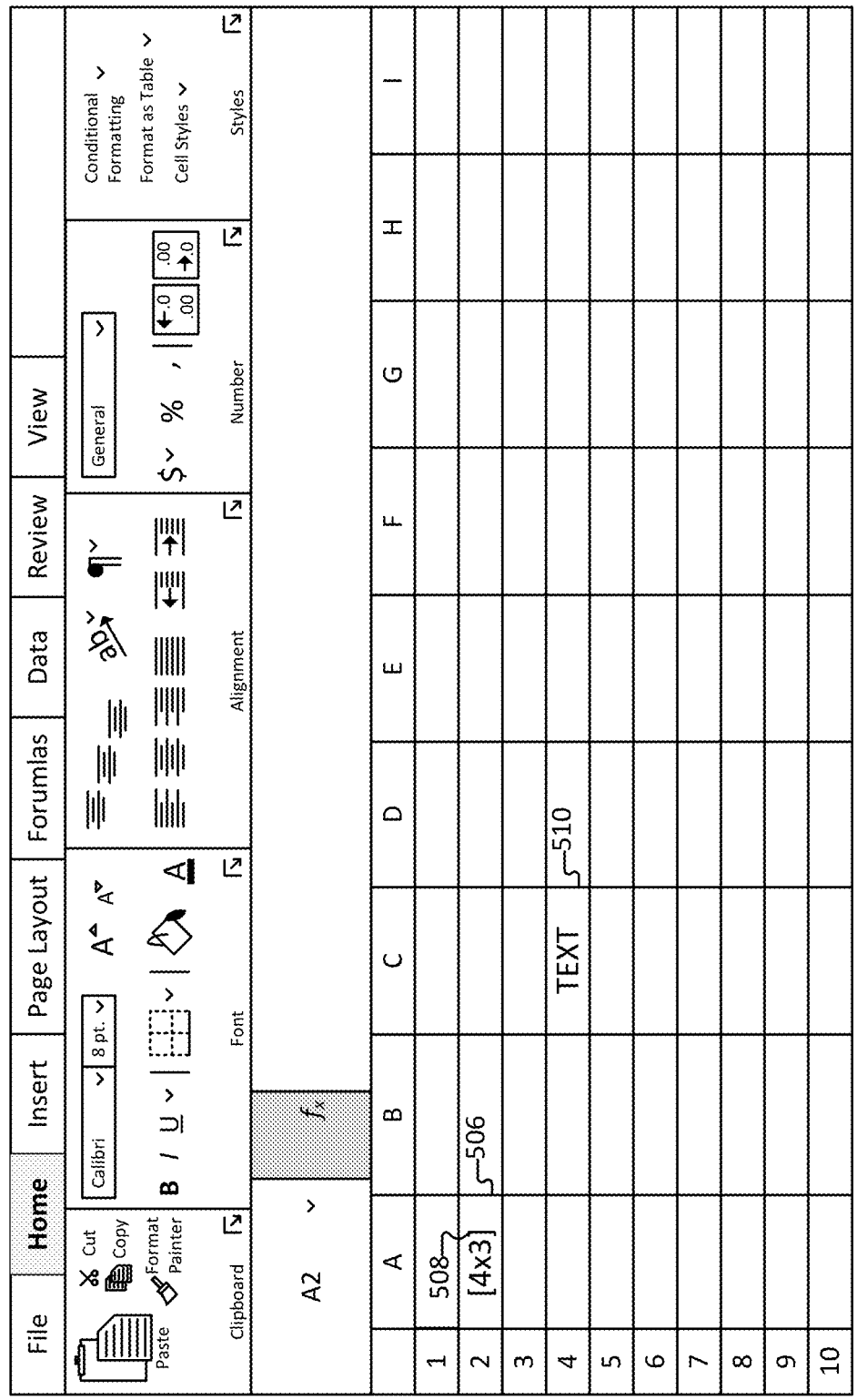
FIG. 5C illustrates an interface storing a collapsed array among other values, according to an example embodiment.

FIG. 5C illustrates an interface 500 storing a collapsed array among other values, according to an example embodiment.

Continuing the example of FIG. 5B, the collapsed 4×3 dimension array 502 is stored in cell A2 506, as denoted by the array symbol 508. As described herein, the collapsed array is stored in a single cell and as such each of the values of the array is stored in that single cell (e.g., cell A2). As the elements of the array 502 are now collapsed into cell A2 506, the cells that previously held spilled elements of the array 502 are now blank and free to hold other values. Accordingly, in this example, a new value (e.g., "Text") is now entered in cell C4 510, which previously contained "Value 11" from the spilled array 502 illustrated in FIG. 5A.

Figure 5D:
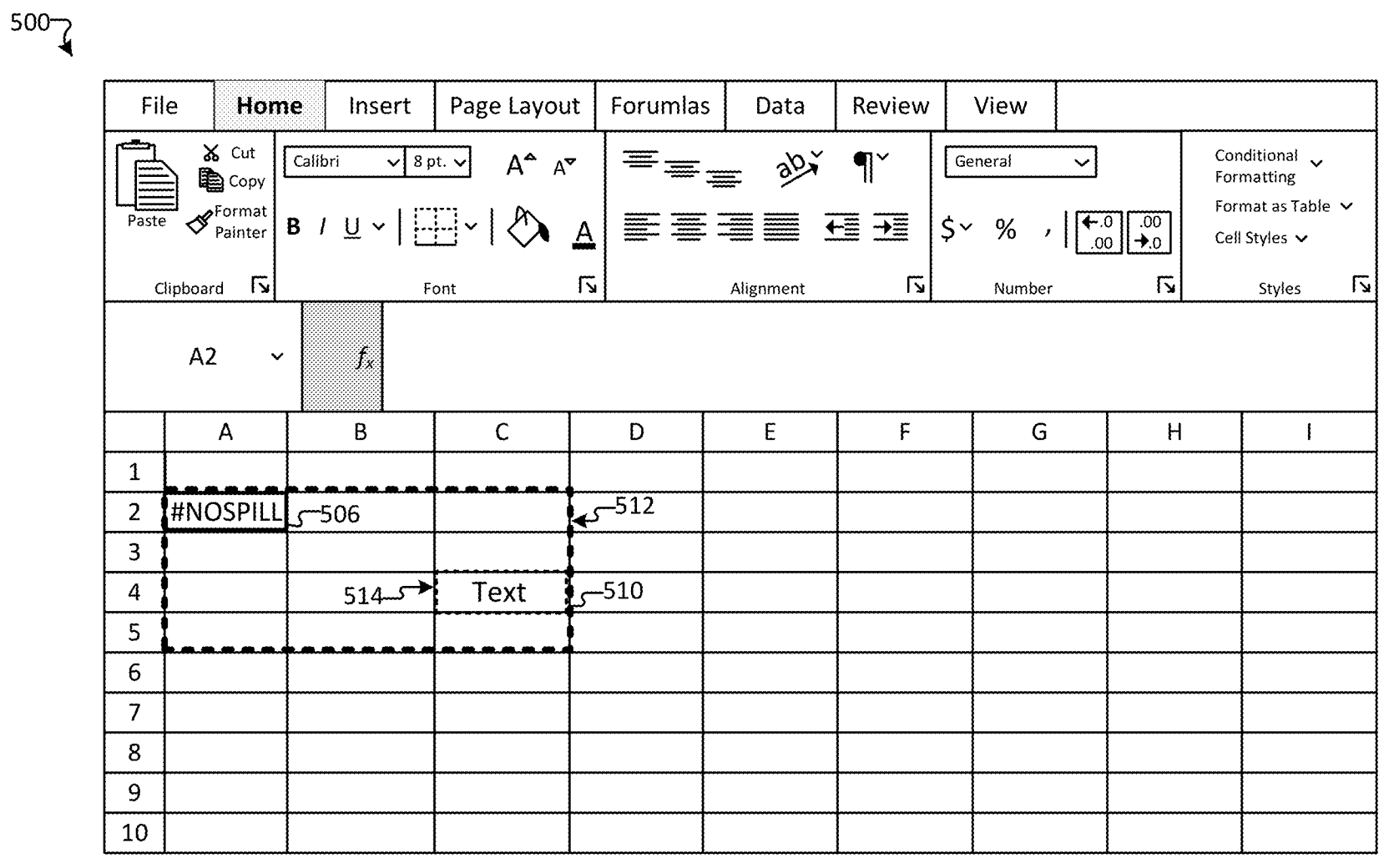

FIG. 5D illustrates an interface 500 indicating a #NOSPILL error, according to an example embodiment.

As described herein, with reference to FIG. 5A and FIG. 5B, a collapsed array can be re-expanded, or spilled over multiple empty cells. If, however, one or more cells a cell to which the array would spill contains a value and therefore obstructs the array from spilling, the array will not spill and will return a no spill error such as, for example, a #NOSPILL error. The example #NOSPILL error indicates to the user that the array cannot spill at least because one or more cells contain data that is blocking the array from spilling. The array therefore will not spill so that the data stored in the obstructing one or more cells may be preserved. Alternatively, in other embodiments, a #NOSPILL error may also result if a value is entered into a cell in which an element of a spilled array already occupies or would like to occupy Furthermore, the #NOSPILL error may also result based on any operation or action that causes one or more cells of the desired spill range to become occupied. For example, instances in which another array has spilled into the cells, a value that was already present in the one or more cells, or if the array dynamically resizes would, in some embodiments, also cause a #NOSPILL error. As described herein, in some embodiments, the array and each of its elements is stored in the anchor cell and may be visibly viewable from one or more cells in a spilled state. Accordingly, because the elements of the array are not stored in the multiple cells in the spilled state, a user may enter data in those cells. In embodiments, if a value is entered in a cell that is occupied by an element of an array in its spilled state, a #NOSPILL error will result. Additionally, the spreadsheet application can also continuously monitor and detect whether obstructions exist that are due to reasons other than entering data into the cell. For example, another array may be spilled into a cell that would be occupied by the spilled array. This is referred to as an array collision. In such an embodiment, the #NOSPILL error might also result if a spilled array collided with another spilled array. In some embodiments, the first spilled array would remain and the second array seeking to spill would result in a #NOSPILL error. In other embodiments, the collision may prompt a notification and a choice to select which array to spill.

Furthermore, in some embodiments, the #NOSPILL error may disallow referencing to the array. In such an example embodiment, once the obstruction is removed, the calculation engine may recalculate the array and the array can once again spill. Alternatively, in other embodiments, the #NOSPILL error might not affect the array contents of the cell. In other words, some aspects of the present disclosure provide for information fidelity, and as such, a no spill error may still allow elements in the array to be referenced and calculations performed thereon despite the error. Thus, in those embodiments, the disclosed no spill error may merely indicate that the array is intact, but cannot be visually displayed at that location on the spreadsheet.

In some embodiments, the user may choose to move the array to another cell, for example and be permitted to spill the array because no cells contain data that would obstruct expansion of the array. In other embodiments, the obstructing one or more cells may be moved or deleted in order to spill contents of the array. Furthermore, the no spill error optionally can flow through to any dependent functions or cells that are referencing that array.

Similar to FIG. 5C, FIG. 5D illustrates the value "Text" stored in cell C4 510, which previously stored "Value 11" of the spilled array 502 illustrated in FIG. 5A. In this example, in response to a selection to spill the array 502, a no spill error such may be displayed. In this example, a #NOSPILL error is displayed in cell A2 506 in response to a selection to spill the array 502. The #NOSPILL indicates to the user that the array cannot spill until the value in the obstructed cell is moved to a non-obstructed cell or deleted. Furthermore, a boundary 512 that visually indicates the size and boundary of the spilled array is also displayed coincidentally with the #NOSPILL error. The boundary 512 allows the user to visually see the one or more obstructing cells. In this example, the obstructing cell C4 510 is positioned within the boundary 512 and visually indicates to the user that the array 502 cannot be spilled due to the value stored in cell C4 510. Additionally, in this embodiment, a cell boundary 514 is also displayed around the obstructing cell to further highlight the obstructing cell.

In other embodiments, if a cell obstructs an array from spilling, the array may still spill. In such an embodiment, the obstructing cell may be shifted to a first cell that does not contain a value and no longer obstructs the array. Alternatively, the value stored in the obstructing cell may be deleted and overwritten by a corresponding array value.

Figure 5E:
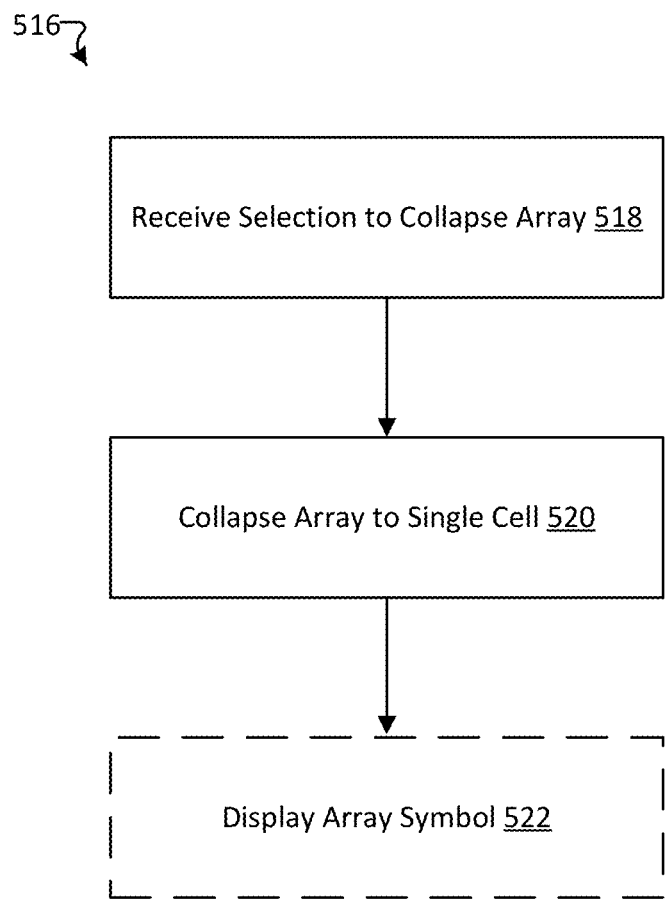
FIG. 5E illustrates a method for collapsing an array, according to an example embodiment.

FIG. 5E illustrates a method 516 for collapsing an array, according to an example embodiment.

The method 516 starts at the receive selection to collapse array operation 518. In some embodiments, the user may select the array (for example selecting the cell in which the array is stored, selecting each value of the array, or selecting a border of the array) and select a right-click or other menu interface operation that provides the option to collapse the array. In other embodiments, by default, a formula that resolves to an array may be collapsed. Accordingly, returning a formula that resolves to an array may also be included in operation 518.

At the collapse array to single cell operation 520, the spreadsheet application, in response to receiving a selection to collapse the array, collapses each element and value of the array into a single cell. In some embodiments, the array is collapsed into the cell in which the array is stored or anchored. In other embodiments, the array is collapsed into another cell, such as another cell selected by the user.

In the display array symbol operation 522, the spreadsheet application displays an array symbol (e.g., array symbol 508) in the cell to which the array is collapsed. In some embodiments this symbol identifies the size of the array and in other embodiments, the symbol identifies that an array is stored therein. In some embodiments, this operation 522 is optional.

Figure 5F:
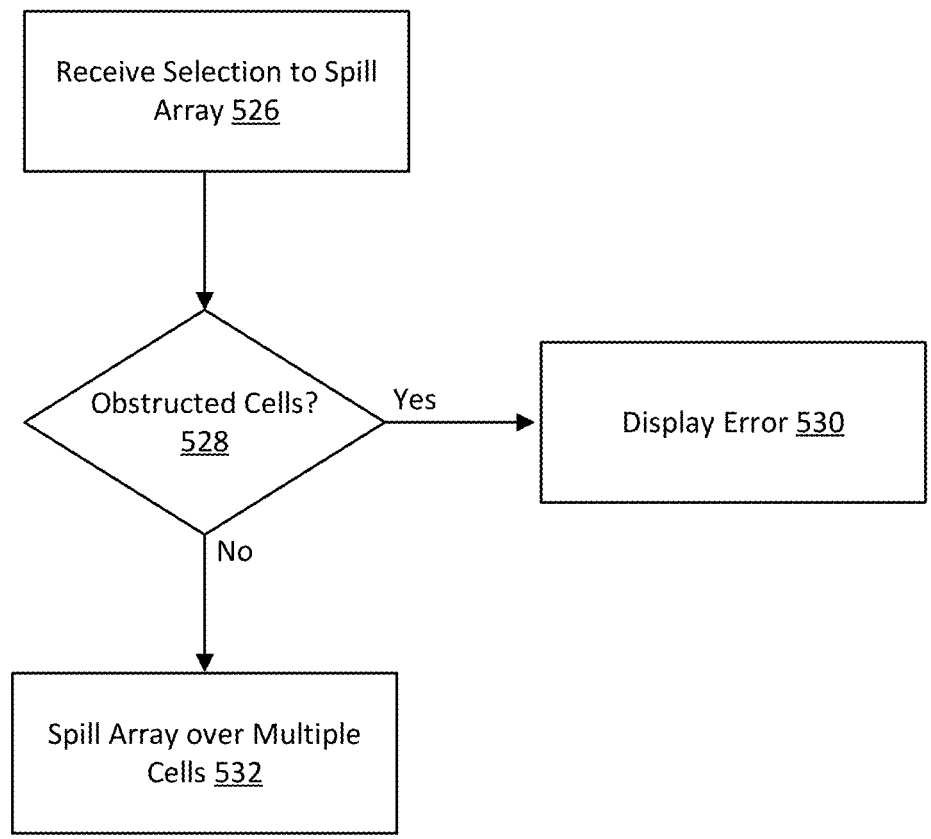
FIG. 5F illustrates a method for expanding a collapsed array, according to an example embodiment.

FIG. 5F illustrates a method 524 for spilling a collapsed array, according to an example embodiment.

The method 524 starts at the receive selection to spill array 526. In this example method 524, the array is collapsed in a single cell. In operation 526, the spreadsheet application may receive a user's selection to spill the array. For example, the user may select the array symbol or the cell in which the array is stored and select a "spill array" option provided in a menu displayed in response to the user's selection.

In embodiments in which the array is already in a spilled state, the spreadsheet application still may check for obstructions. As described herein, a #NOSPILL error may also result if a value is entered into a cell in which an element of a spilled array already occupies. Alternatively or additionally, a #NOSPILL error may also result based on any operation or action that causes one or more cells of the desired spill range to become occupied. For example, instances in which another array has spilled into the cells, a value that was already present in the one or more cells, or if the array dynamically resizes would, in some embodiments, also cause a #NOSPILL error. Because the array and each of its elements is stored in the anchor cell, in some embodiments, the array elements may be viewable from (and occupied by) those one or more cells in the spilled state, but not stored in those cells. Accordingly, if a value is entered in a cell that is occupied by an element of an array in its spilled state, a #NOSPILL error will result. Thus, in operation 526, the spreadsheet application can continuously monitor and detect whether a value is entered in a cell in which an element of the array occupies in its spilled state to determine if an obstruction exists and a #NOSPILL error results. Additionally, in operation 526, the spreadsheet application can also continuously monitor and detect whether obstructions exist that are due to reasons other than entering data into the cell. For example, another array may be spilled into a cell that would be occupied by the spilled array. This is referred to as an array collision. In such an embodiment, the #NOSPILL error might also result if a spilled array collided with another spilled array. In some embodiments, the first spilled array would remain and the second array seeking to spill would result in a #NOSPILL error. In other embodiments, the collision may prompt a notification and a choice to select which array to spill.

At the obstructed cells decision operation 528, the spreadsheet application determines the size of the array to be spilled and determines whether any cells in which the array is to be spilled store a value. If the spreadsheet application identifies at least one cell to which the array would spill stores a value, the method 524 proceeds to the display error operation 530 (e.g., YES at the obstructed cells decision operation 528).

At the display error operation 530, the spreadsheet application may display an error indicating that the array cannot be spilled. As described herein, an error may be a #NOSPILL error that may be visually displayed from the cell in which the array is stored. In other embodiments, other errors may be displayed. Furthermore, in some embodiments, the spreadsheet application may display a border around the cells that would occupy the border of the array. Alternatively or additionally, the spreadsheet application may display a border around the one or more obstructing cells to visually indicate the one or more obstructions to the user.

Alternatively, if the spreadsheet application does not identify at least one cell to which the array would spill stores a value, the method 524 proceeds to the spill array to multiple cells operation 532 (e.g., NO at the obstructed cells decision operation 528). At the spill array to multiple cells operation 532, the spreadsheet application spills the array so that each value of the array is viewed from a single cell of the spreadsheet.

Figure 6:
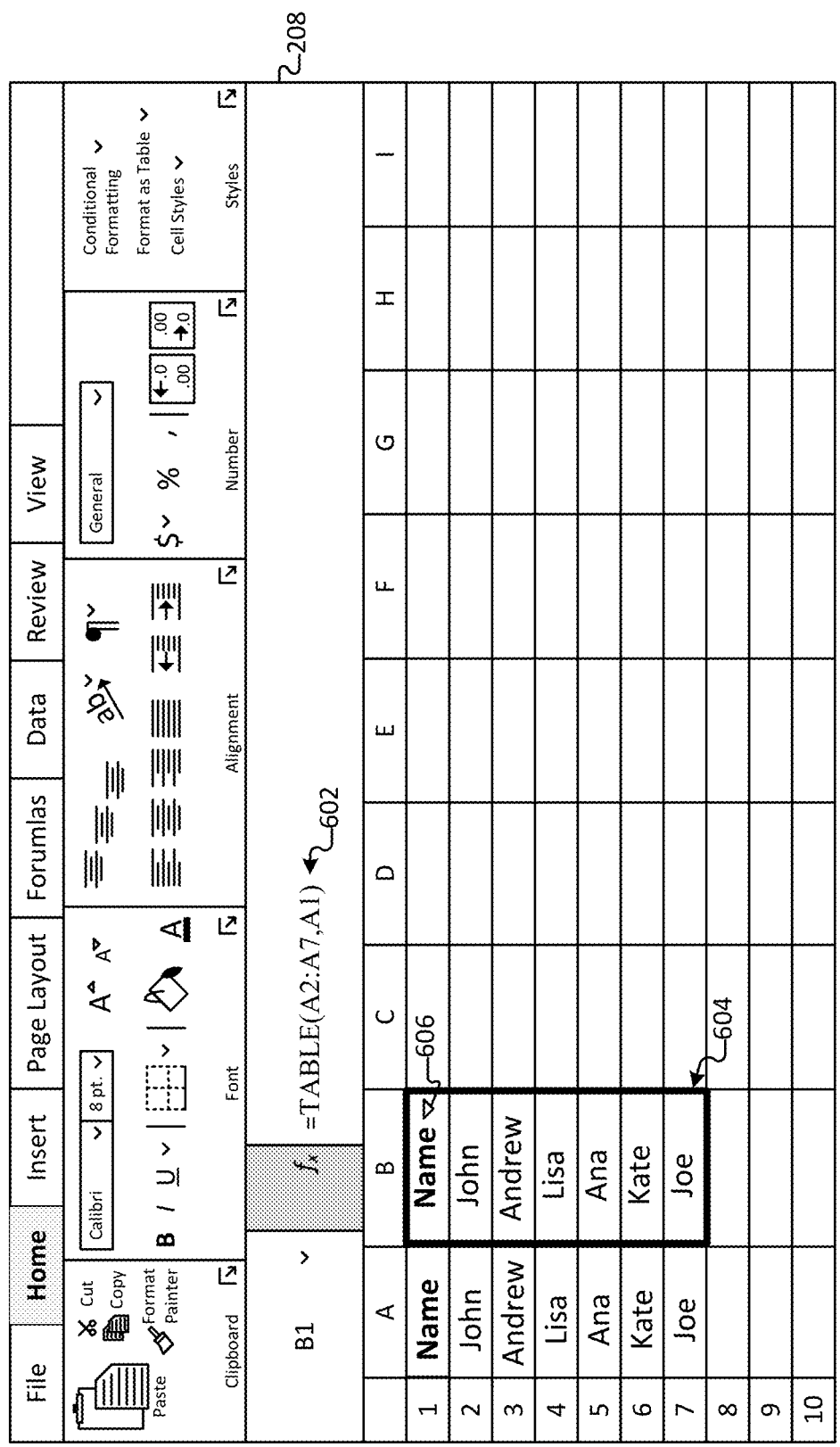
FIG. 6 illustrates an interface that spills the contents of an array to a table, according to an example embodiment.

FIG. 6 illustrates an interface 600 that spills the contents of an array to a table, according to an example embodiment.

Aspects of the present disclosure also include outputting elements of an array to a table. A table, as used in many spreadsheet applications, is a structured entity having many features that are not found in an array (features including, for example, header values, drop down menus, sort/filter functionality, etc.). Aspects therefore provide an array and the generation of a table as an output using the values of the array, wherein the user can interact with the table (sort the values of the table, filter values, etc.). Such interaction with the table will also change the underlying formula that generates the table. In particular, operations on a table (e.g., sort, filter, etc.) may be treated like view operations on the table. Accordingly, the table edits the formula of the array/table based on the operations (e.g., sort, filter, etc.) that are applied to each column or row as well as the order in which those operations were applied. In other embodiments, other methods could be used to save the manipulation, such as, for example, saving the cell metadata. Subsequently if the underlying data in the array is changed (edited, deleted, or added), the resultant table will be updated accordingly. Furthermore, any operations set on the table would also be applied to the changed data in the table. Furthermore, any formulas or cells that depend on the values of the table may also be updated throughout the spreadsheet.

In the example illustrated in FIG. 6, the formula 602 (e.g., "=Table(A2:A7, A1) is provided in the formula bar 208. In an example, the Table function accepts two arguments, the values to return and the name of the header. Accordingly, the result is a table 604 created from an array using values stored in cells A2 through A7 and a header of A1. In an example, the operations performed on the table will also adjust the formula 602 of the table. So if the user sorts the values in the table using, for example, a drop down menu of the table 604 (e.g., using on screen buttons 606), the formula 602 will also be adjusted to display, for example, "=Table(Sort(A2:A7), A1)."

Alternatively or additionally, metadata may be attached to the table, wherein the metadata is records each modification performed on the table while the formula 602 remains unchanged.

Figure 7:
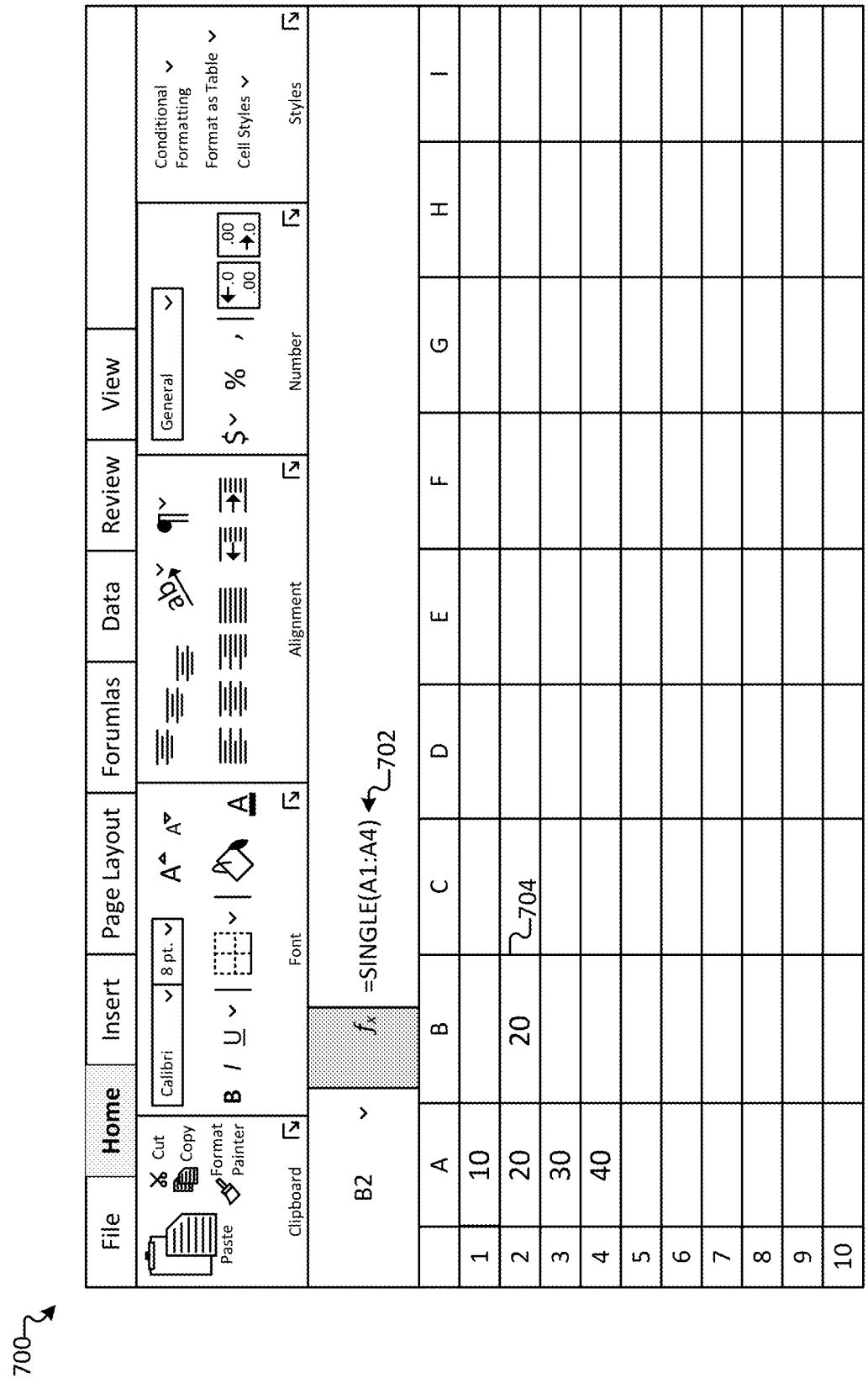
FIG. 7 illustrates an interface for defining implicit intersection of data using a SINGLE function.

FIG. 7 illustrates an interface 700 for defining implicit intersection of data using a SINGLE function.

Implicit intersection is calculation logic that spreadsheet applications previously used to resolve a single value when presented with multiple values. In the case of a range, the value in the same row or column as the formula is selected. While in the case of an array, the top left element is selected. In particular, for a cell that references a range of values, spreadsheet applications today may automatically return a single value corresponding to the row that intersects the cell of that range. So, for example, a range of values may be stored in cells A1 through A5. Furthermore, cell B4 might reference the range A1 through A5. Spreadsheet applications today would return a single value that intersects the cell of that row. So, the spreadsheet application would return the single value stored in cell A4 (because cell A4 intersects cell B4). Aspects of the present disclosure, however, describe the ability to return the entire range and not just a single value. However, in order to facilitate backwards compatibility with prior versions of the spreadsheet application that implement implicit intersection, an example SINGLE function may be used. In embodiments, the SINGLE function prevents a spreadsheet authored in an old workbook from returning different results if opened in a new workbook in order to maintain calculation fidelity. Accordingly, the SINGLE function causes the spreadsheet application to calculate its argument using the previous calculation logic, such as implicit intersection. Accordingly, aspects of the present disclosure further provide preserving information and calculations on data authored in an old workbook when the particular spreadsheet file is opened in a new workbook, wherein the new workbook may contain changes to functions that would otherwise affect the data. In such an embodiment, the SINGLE function may be inserted in the existing function to preserve the preexisting calculation methodology. In an example, the new spreadsheet application may review each function in an opened workbook to identify all functions that would calculate differently if opened in an old workbook. In an example, those identified functions would be automatically wrapped into the SINGLE function so that those functions will calculate using the rules of the old function, thereby maintaining data fidelity. Alternatively or additionally, the spreadsheet application may merely insert the SINGLE function in the formula bar so that it may be viewed by the user, and acting as a runtime display. However, from an application perspective, the original formula (excluding the SINGLE) is evaluated using the old calculation path.

In the example illustrated in FIG. 7, a spreadsheet originally authored in an older version of a spreadsheet application is now opened in a spreadsheet application having the aspects described herein. In this example, the cell B2 may have formula "=A1:A4" applied thereto, which would output the entire array of four values if opened in the present spreadsheet application. However, the older version of the spreadsheet application would result in only a single value, such as the value "20" corresponding to the value stored in the corresponding cell A2. Accordingly, the SINGLE function 702 (e.g., "=SINGLE(A1:A4)) is automatically applied to the formula to return a single result "20" that would similarly be output if that spreadsheet opened in an older version of the disclosed spreadsheet application. Accordingly, backwards compatibility is supported. In some embodiments, the SINGLE part of the formula may be stripped on file save so that older versions of the spreadsheet application will still be able to calculate the file.

FIGS. 8-11 and the associated descriptions provide a discussion of a variety of operating environments in which aspects of the disclosure may be practiced. However, the devices and systems illustrated and discussed with respect to FIGS. 8-11 are for purposes of example and illustration and are not limiting of a vast number of computing device configurations that may be utilized for practicing aspects of the disclosure, as described herein.

Figure 8:
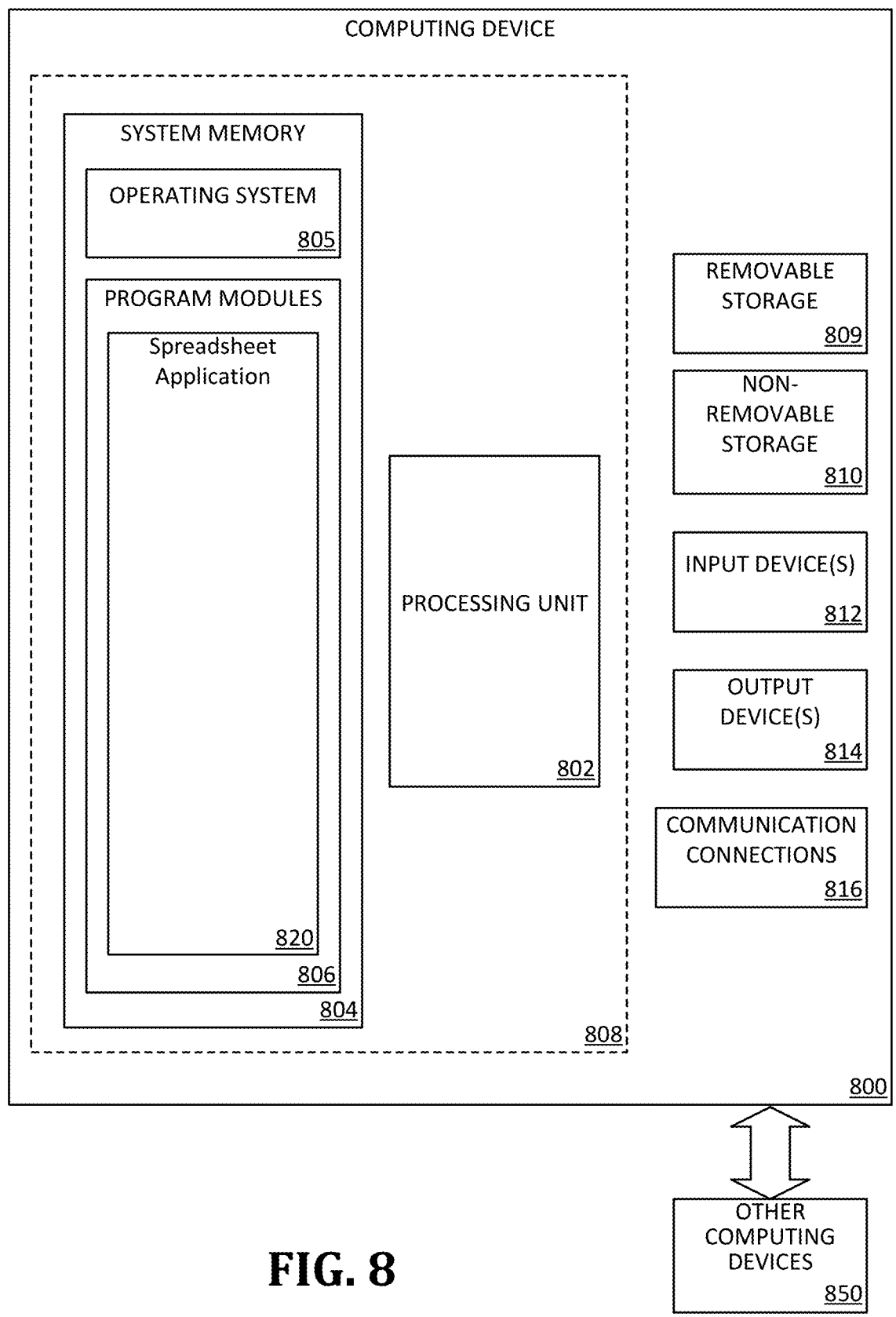
FIG. 8 is a block diagram illustrating physical components (e.g., hardware) of a computing device with which aspects of the disclosure may be practiced.

FIG. 8 is a block diagram illustrating physical components (e.g., hardware) of a computing device 800 with which aspects of the disclosure may be practiced.

The computing device components described below may have computer executable instructions for implementing a spreadsheet application 820 on a computing device (e.g., server computing device 108 and/or client computing device 104), including computer executable instructions for spreadsheet application 820 that can be executed to implement the methods disclosed herein. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 and one or more program modules 806 suitable for running spreadsheet application 820.

The operating system 805, for example, may be suitable for controlling the operation of the computing device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810. As stated above, a number of program modules and data files may be stored in the system memory 804. While executing on the processing unit 802, the program modules 806 (e.g., spreadsheet application 820) may perform processes including, but not limited to, the aspects, as described herein.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 850. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9A:
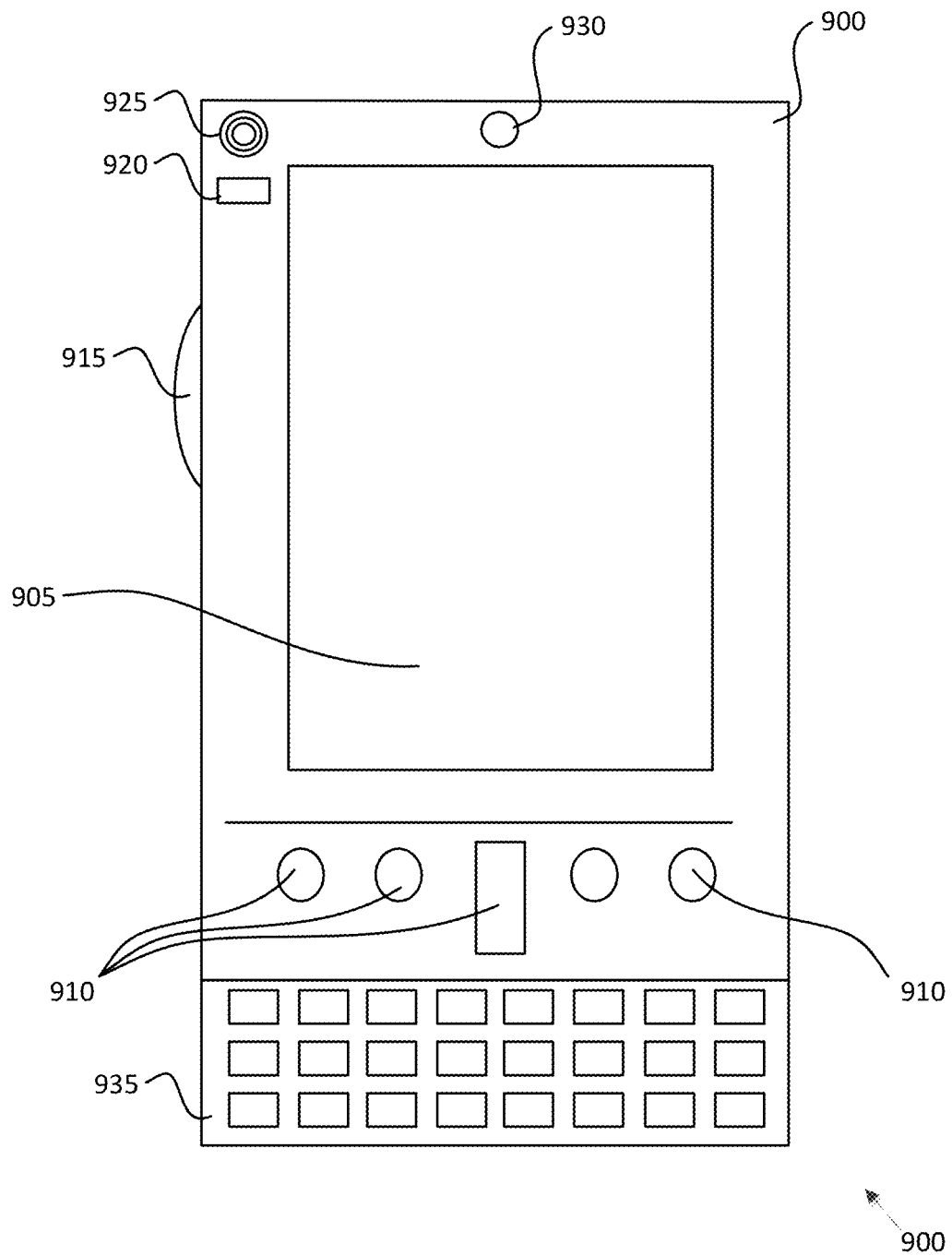
FIG. 9A and FIG. 9B illustrate a mobile computing device, for example, a mobile telephone, a smart phone, wearable computer (such as a smart watch), a tablet computer, a laptop computer, and the like, with which embodiments of the disclosure may be practiced.
Figure 9B:
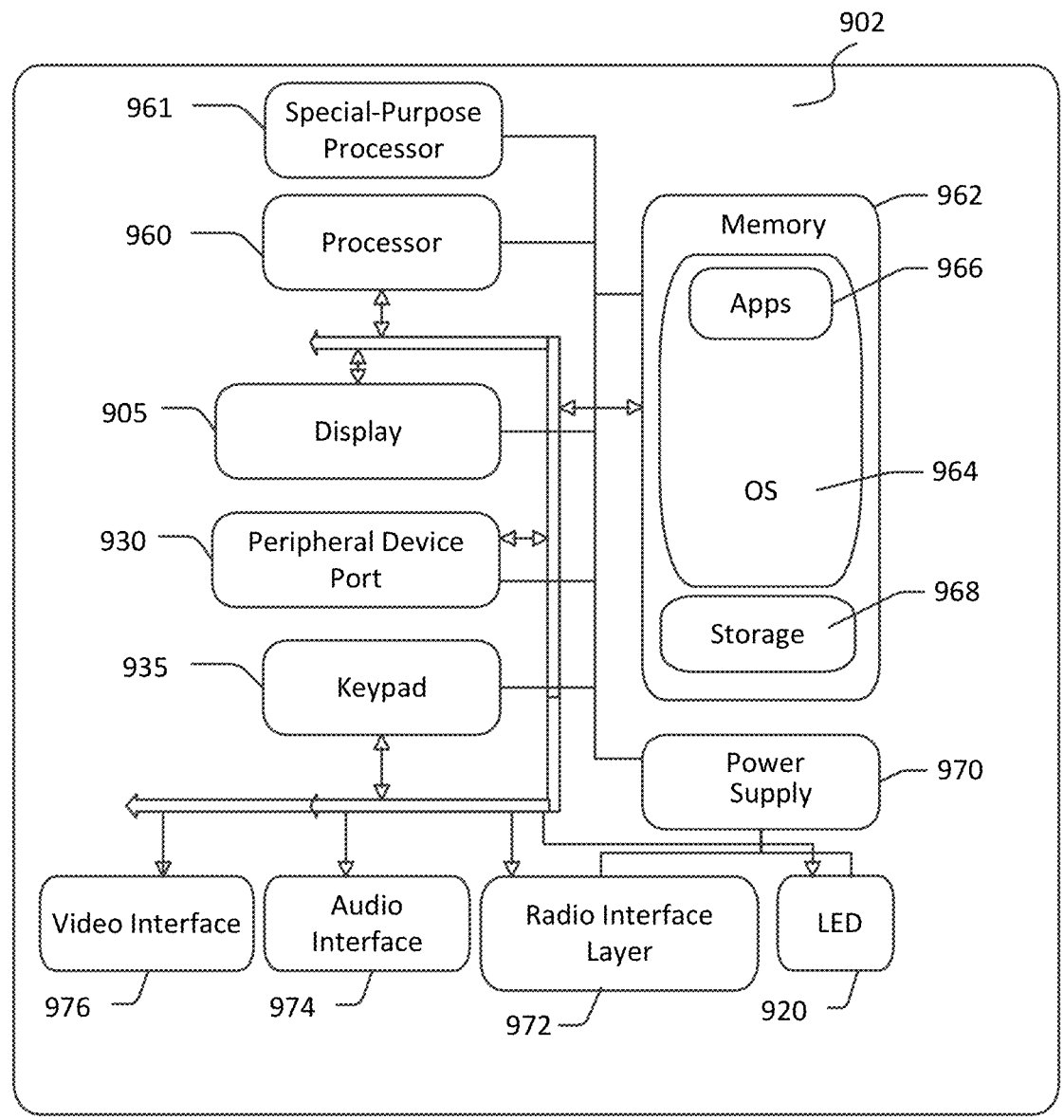

FIG. 9A and FIG. 9B illustrate a mobile computing device 900, for example, a mobile telephone, a smart phone, wearable computer (such as a smart watch), a tablet computer, a laptop computer, and the like, with which embodiments of the disclosure may be practiced.

In some aspects, the client may be a mobile computing device. With reference to FIG. 9A, one aspect of a mobile computing device 900 for implementing the aspects is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. The display 905 of the mobile computing device 900 may also function as an input device (e.g., a touch screen display). If included, an optional side input element 915 allows further user input. The side input element 915 may be a rotary switch, a button, or any other type of manual input element. In alternative aspects, mobile computing device 900 may incorporate more or less input elements. For example, the display 905 may not be a touch screen in some embodiments. In yet another alternative embodiment, the mobile computing device 900 is a portable phone system, such as a cellular phone. The mobile computing device 900 may also include an optional keypad 935. Optional keypad 935 may be a physical keypad or a "soft" keypad generated on the touch screen display. In various embodiments, the output elements include the display 905 for showing a graphical user interface (GUI), a visual indicator 920 (e.g., a light emitting diode), and/or an audio transducer 925 (e.g., a speaker). In some aspects, the mobile computing device 900 incorporates a vibration transducer for providing the user with tactile feedback. In yet another aspect, the mobile computing device 900 incorporates input and/or output ports, such as an audio input (e.g., a microphone jack), an audio output (e.g., a headphone jack), and a video output (e.g., a HDMI port) for sending signals to or receiving signals from an external device.

FIG. 9B is a block diagram illustrating the architecture of one aspect of a mobile computing device. That is, the mobile computing device 900 can incorporate a system (e.g., an architecture) 902 to implement some aspects. In one embodiment, the system 902 is implemented as a "smart phone" capable of running one or more applications (e.g., browser, e-mail, calendaring, contact managers, messaging clients, games, and media clients/players). In some aspects, the system 902 is integrated as a computing device, such as an integrated personal digital assistant (PDA) and wireless phone.

One or more application programs 966 may be loaded into the memory 962 and run on or in association with the operating system 964. Examples of the application programs include phone dialer programs, e-mail programs, personal information management (PIM) programs, word processing programs, spreadsheet programs, Internet browser programs, messaging programs, and so forth. The system 902 also includes a non-volatile storage area 968 within the memory 962. The non-volatile storage area 968 may be used to store persistent information that should not be lost if the system 902 is powered down. The application programs 966 may use and store information in the non-volatile storage area 968, such as email or other messages used by an email application, and the like. A synchronization application (not shown) also resides on the system 902 and is programmed to interact with a corresponding synchronization application resident on a host computer to keep the information stored in the non-volatile storage area 968 synchronized with corresponding information stored at the host computer. As should be appreciated, other applications may be loaded into the memory 962 and run on the mobile computing device 900, including the instructions for associating one or more images with one or more cells of a spreadsheet as described herein (e.g., field component, associate component, array component, hybrid component, operation component, and/or UX component, etc.).

The system 902 has a power supply 970, which may be implemented as one or more batteries. The power supply 970 may further include an external power source, such as an AC adapter or a powered docking cradle that supplements or recharges the batteries. The system 902 may also include a radio interface layer 972 that performs the function of transmitting and receiving radio frequency communications. The radio interface layer 972 facilitates wireless connectivity between the system 902 and the "outside world," via a communications carrier or service provider. Transmissions to and from the radio interface layer 972 are conducted under control of the operating system 964. In other words, communications received by the radio interface layer 972 may be disseminated to the application programs 966 via the operating system 964, and vice versa.

The visual indicator 920 may be used to provide visual notifications, and/or an audio interface 974 may be used for producing audible notifications via an audio transducer 925 (e.g., audio transducer 925 illustrated in FIG. 9A). In the illustrated embodiment, the visual indicator 920 is a light emitting diode (LED) and the audio transducer 925 may be a speaker. These devices may be directly coupled to the power supply 970 so that when activated, they remain on for a duration dictated by the notification mechanism even though the processor 960 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 925, the audio interface 974 may also be coupled to a microphone to receive audible input, such as to facilitate a telephone conversation. In accordance with embodiments of the present disclosure, the microphone may also serve as an audio sensor to facilitate control of notifications, as will be described below. The system 902 may further include a video interface 976 that enables an operation of peripheral device 930 (e.g., on-board camera) to record still images, video stream, and the like.

A mobile computing device 900 implementing the system 902 may have additional features or functionality. For example, the mobile computing device 900 may also include additional data storage devices (removable and/or non-removable) such as, magnetic disks, optical disks, or tape. Such additional storage is illustrated in FIG. 9B by the non-volatile storage area 968.

Data/information generated or captured by the mobile computing device 900 and stored via the system 902 may be stored locally on the mobile computing device 900, as described above, or the data may be stored on any number of storage media that may be accessed by the device via the radio interface layer 972 or via a wired connection between the mobile computing device 900 and a separate computing device associated with the mobile computing device 900, for example, a server computer in a distributed computing network, such as the Internet. As should be appreciated such data/information may be accessed via the mobile computing device 900 via the radio interface layer 972 or via a distributed computing network. Similarly, such data/information may be readily transferred between computing devices for storage and use according to well-known data/information transfer and storage means, including electronic mail and collaborative data/information sharing systems.

As should be appreciated, FIGS. 9A and 9B are described for purposes of illustrating the present methods and systems and is not intended to limit the disclosure to a particular sequence of steps or a particular combination of hardware or software components.

Figure 10:
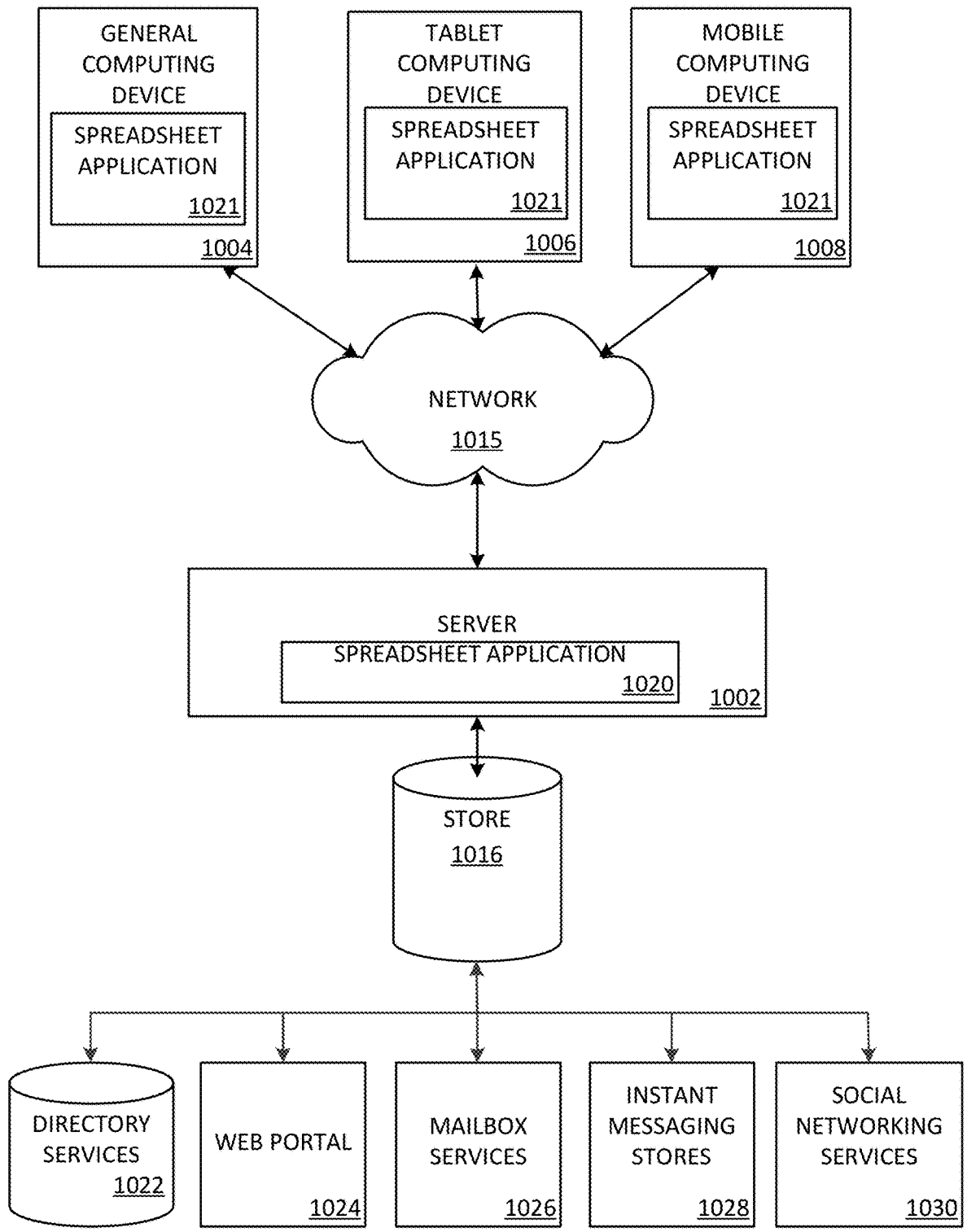
FIG. 10 illustrates one aspect of the architecture of a system for processing data received at a computing system from a remote source, such as a general computing device (e.g., personal computer), tablet computing device, or mobile computing device.

FIG. 10 illustrates one aspect of the architecture of a system for processing data received at a computing system from a remote source, such as a general computing device 1004 (e.g., personal computer), tablet computing device 1006, or mobile computing device 1008, as described above. Content displayed at server device 1002 may be stored in different communication channels or other storage types. For example, various documents may be stored using a directory service 1022, a web portal 1024, a mailbox service 1026, an instant messaging store 1028, or a social networking service 1030. The spreadsheet application 1021 may be employed by a client that communicates with server device 1002, and/or the spreadsheet application 1020 may be employed by server device 1002. The server device 1002 may provide data to and from a client computing device such as a general computing device 1004, a tablet computing device 1006 and/or a mobile computing device 1008 (e.g., a smart phone) through a network 1015. By way of example, the computer system described above may be embodied in a general computing device 1004 (e.g., personal computer), a tablet computing device 1006 and/or a mobile computing device 1008 (e.g., a smart phone). Any of these embodiments of the computing devices may obtain content from the store 1016, in addition to receiving graphical data useable to either be pre-processed at a graphic-originating system or post-processed at a receiving computing system.

As should be appreciated, FIG. 10 is described for purposes of illustrating the present methods and systems and is not intended to limit the disclosure to a particular sequence of steps or a particular combination of hardware or software components.

Figure 11:
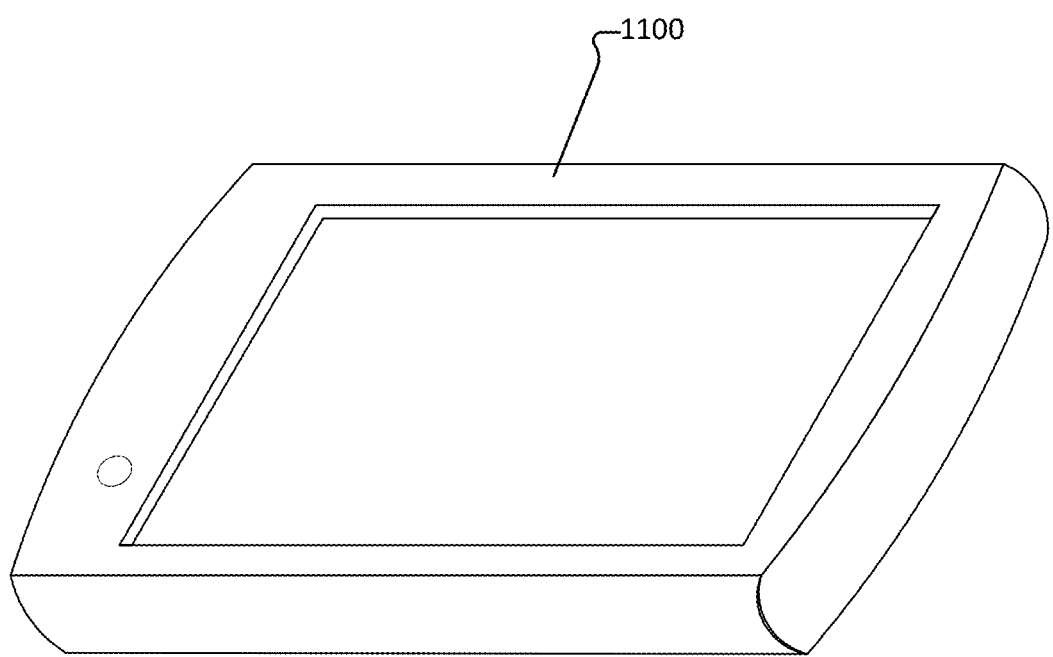
FIG. 11 illustrates an exemplary tablet computing device that may execute one or more aspects disclosed herein.

FIG. 11 illustrates an exemplary tablet computing device 1100 that may execute one or more aspects disclosed herein.

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computer-implemented method for resolving a cell to an array of values, the method comprising:
   receiving a selection of a range of cells of a spreadsheet, wherein each cell comprises a value of a plurality of values;
   receiving a selection to create an array;
   creating the array that includes each of the plurality of values, wherein each of the plurality of values is stored in a cell of the range of cells;
   receiving a selection to collapse the array into a single cell of the range of cells; and
   collapsing the array in the single cell of the range of cells, wherein the plurality of values of the array are referenceable in the spreadsheet as one or more values selected from the group consisting of: individual values within the single cell, a subset of values within the single cell, and the plurality of values within the single cell, and wherein collapsing the array empties each of the range of cells except the single cell including the array.

2. The computer-implemented method of claim 1, wherein the array of the plurality of values is spilled back over the range of cells of the spreadsheet from the single cell.

3. The computer-implemented method of claim 2, further comprising:
   receiving a reference to a cell of the range of cells to which the array is spilled; and
   displaying a value corresponding to the referenced cell.

4. The computer-implemented method of claim 2, further comprising:
   determining whether one or more obstructing cells exist; and
   based on a determination that at least one obstructing cell exists, provide an error.

5. The computer-implemented method of claim 4, wherein providing the error further comprises:
   displaying a #NOSPILL error in the cell in which the array is stored.

6. The computer-implemented method of claim 1, further comprising:
   receiving a structured reference to an element of the array; and
   displaying a value corresponding to the structured reference of the array.

7. The computer-implemented method of claim 1, further comprising:
   receiving a notification to perform at least one of an update to a value of the array and a recalculation of a formula associated with the array; and
   updating the array to reflect the change.

8. The computer-implemented method of claim 7, wherein the change comprises modifying the value.

9. The computer-implemented method of claim 7, wherein the change comprises adding a new value to the array.

10. The computer-implemented method of claim 1, further comprising:
    in response to collapsing the array into the single cell, displaying an array symbol in the single cell.

11. The computer-implemented method of claim 1, wherein the single cell is a cell in which the array is stored.

12. The computer-implemented method of claim 1, further comprising:
    displaying an array symbol in the single cell.

13. A system comprising:
    at least one processing unit; and
    at least one memory storing computer executable instructions that, when executed by the at least one processing unit, cause the system to perform a method, the method comprising:
      receiving a selection of a range of cells of a spreadsheet, wherein each cell comprises a value of a plurality of values;
      receiving a selection to create an array;
      creating the array that includes each of the plurality of values, wherein each of the plurality of values is stored in a cell of the range of cells; and
      collapsing the array into a single cell of the plurality of cells, wherein the plurality of values of the array are referenceable in the spreadsheet as one or more values selected from the group consisting of: as individual values within the single cell, as a subset of values within the single cell, and the plurality of values within the single cell, and wherein collapsing the array empties each of the range of cells.

14. The system of claim 13, further comprising:
    spilling the array of the plurality of values from the single cell back over the range of cells of the spreadsheet;
    receiving a reference to a cell within the range of cells; and
    displaying a value corresponding to the referenced cell.

15. The system of claim 14, further comprising:
    determining whether one or more obstructing cells exist; and
    based on a determination that at least one obstructing cell exists, displaying an error.

16. The system of claim 13, further comprising:
    receiving a structured reference to an element of the array; and
    displaying a value corresponding to the structured reference of the array.

17. The system of claim 13, further comprising:
    receiving a notification to perform at least one of an update to a value of the array and a recalculation of a formula associated with the array; and updating the array to reflect one of the update and the recalculation.

18. The system of claim 13, further comprising:
in response to collapsing the array into the single cell, displaying an array symbol in the single cell.

19. A system comprising:
at least one processing unit; and
at least one memory storing computer executable instructions that, when executed by the at least one processing unit, cause the system to perform a method, the method comprising:
 receiving a formula at a spreadsheet;
 in response to receiving the formula, resolving the formula to an array, wherein the array comprises a plurality of values, and wherein each of the plurality of values is stored in a cell of a range of cells; and
 collapsing the array into a single cell, wherein the plurality of values of the array are referenceable in the spreadsheet as one or more values selected from the group consisting of: as individual values within the single cell, as a subset of values within the single cell, and the plurality of values within the single cell, and wherein collapsing the array empties each of the range of cells.

20. The system of claim 19, further comprising:
displaying a border around the single cell comprising the array.

* * * * *